Sept. 2, 1947.  R. R. RIDGWAY  2,426,643
METHOD AND APPARATUS FOR FUSING REFRACTORY MATERIALS
Filed May 8, 1944   7 Sheets-Sheet 2

Inventor
Raymond R. Ridgway
By William T Kiesner
Attorney

Sept. 2, 1947. R. R. RIDGWAY 2,426,643
METHOD AND APPARATUS FOR FUSING REFRACTORY MATERIALS
Filed May 8, 1944 7 Sheets—Sheet 3
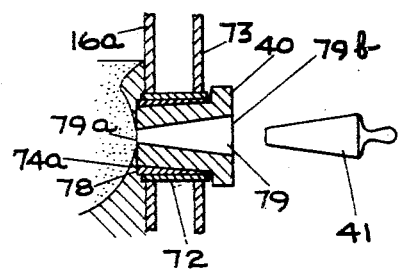
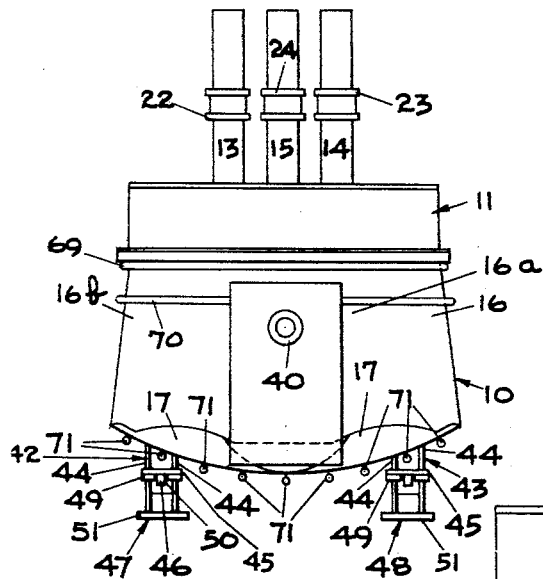
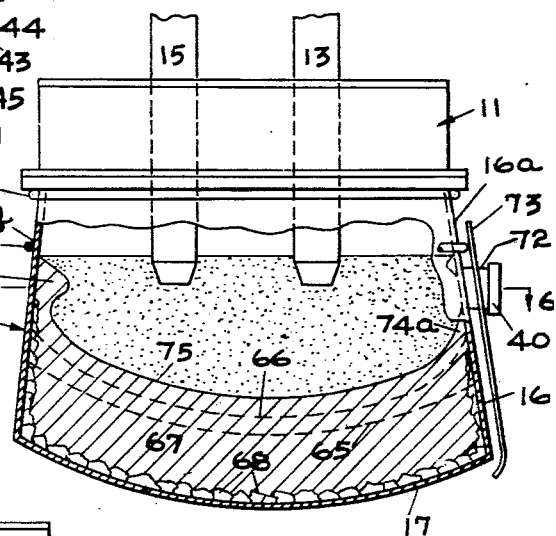
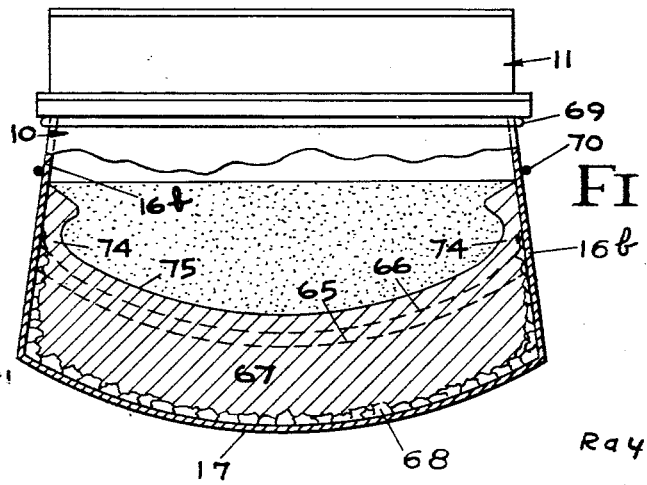
Inventor
Raymond R. Ridgway
By William T Kniesner
Attorney

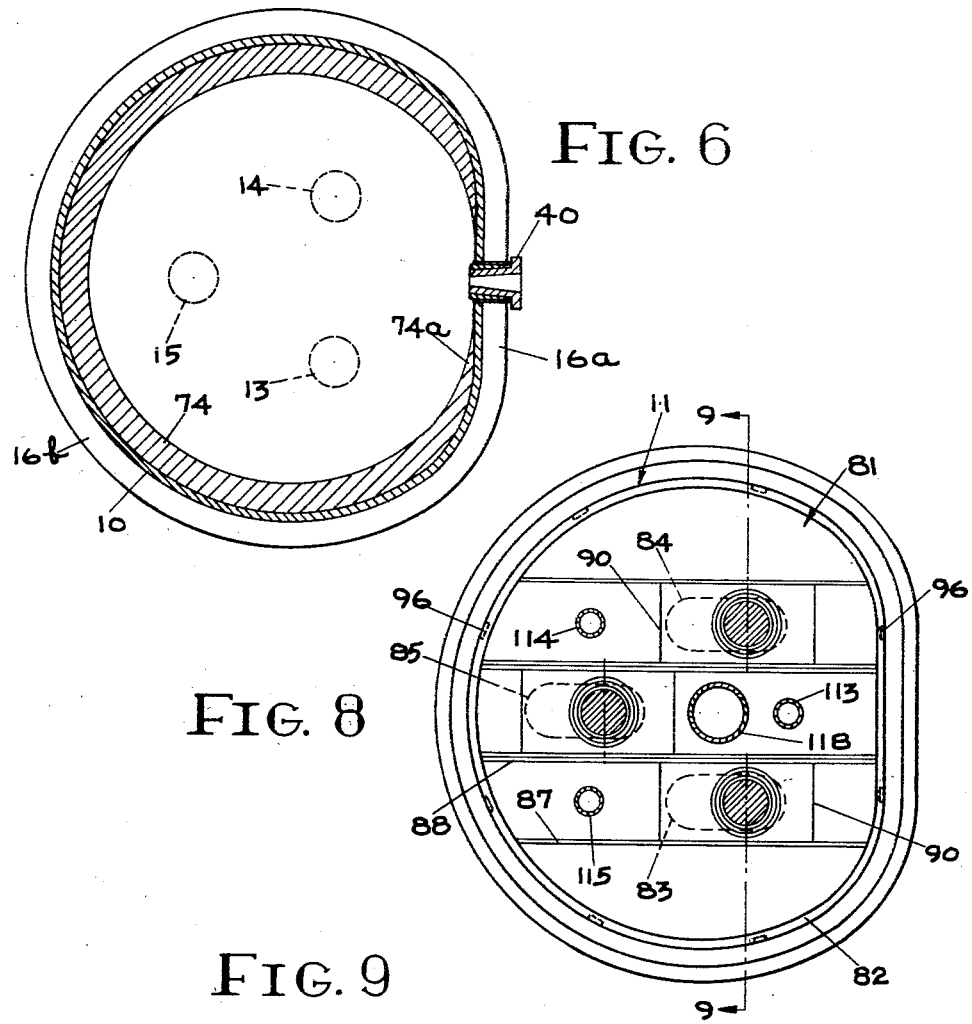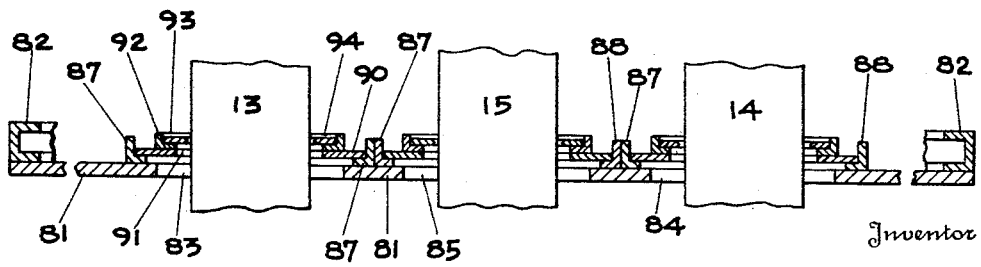

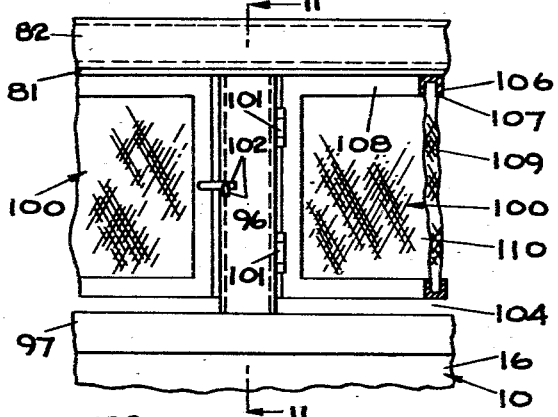
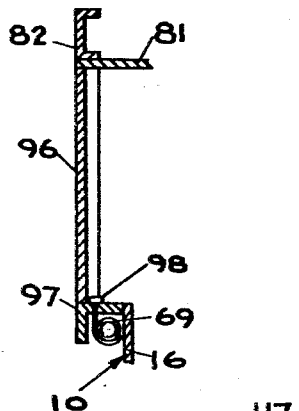

Inventor
Raymond R. Ridgway

Sept. 2, 1947.        R. R. RIDGWAY        2,426,643
METHOD AND APPARATUS FOR FUSING REFRACTORY MATERIALS
Filed May 8, 1944        7 Sheets-Sheet 7

Inventor

Raymond R. Ridgway

By William T. Kneener
Attorney

Patented Sept. 2, 1947

2,426,643

UNITED STATES PATENT OFFICE 2,426,643

METHOD AND APPARATUS FOR FUSING REFRACTORY MATERIALS

Raymond R. Ridgway, Niagara Falls, N. Y., assignor to Norton Company, Worcester, Mass., a corporation of Massachusetts Application May 8, 1944, Serial No. 534,653

29 Claims. (Cl. 13—9)

This invention relates to a method and apparatus for the continuous production of fused materials of high melting point, of which fused alumina is a good and preferred illustration; alumina ($Al_2O_3$) having a melting point on the order of 2,000° C.

One of the objects of this invention is to provide a practical and dependable method and apparatus for fusing, and then casting for solidification, refractory oxide materials of high melting or fusing point, with such arrangement and sequences of steps in the method and such controls in the operation of the apparatus that substantial continuity of processing of the oxide may be achieved, interrupted only by circumstances, such as the need for repair or replacement of various parts. Another object of this invention is to provide, in a method and apparatus of the above-mentioned character, for the dependable and efficient production, for the metallic furnace shell, of a lining capable of withstanding the effects of the high-fusing-point fused material contained therein and of dependably protecting the shell, and for the subsequent maintenance and control of the lining during long-continued operation and throughout such variations or variables as may accompany, or may be made to accompany, the otherwise continuous processing, including such factors as variability in quantity of the charge or melt, rate and character of supply of unfused or "raw" material to the furnace, energy or power input to the charge, etc., etc. Another object is to provide a practical and dependable method for producing, and maintaining in proper and safe operating condition, a lining in such a metal furnace shell of the same material as the product undergoing fusing, and to provide steps of procedure and of control to so maintain the lining during and throughout such variable factors as quantity of the melt in the furnace, rate or character of withdrawal of fused material, rate or character of supply of unfused material to the furnace, etc., etc.

Another object is to provide a practical method and apparatus for achieving the reliable and consistent casting or pouring of the high-fusing-point refractory oxide at suitable degree of superheat where it is desired to give the final product, such as the cast and ultimately solidified alumina, certain desired characteristics, particularly as to character and extent of pore structure, character of crystalline structure, etc., etc. Another object is to provide a simple and practical method and apparatus for achieving simple and reliable access, particularly throughout and during long continuity of operation, to regions of the melt that are of the desired superheat for withdrawal of superheated molten material therefrom for pouring or casting. Another object is to provide a method for producing and maintaining a lining of the above-mentioned character for proper functioning thereof throughout such a variable as change in relation between the electrodes by which the charge or melt is heated and the furnace and lining containing the charge.

Another object is to provide a method and apparatus for fusing high-fusing-point material, such as alumina, that will be capable of being carried on or operated in practice under conditions of substantial continuity of feed or supply to the furnace charge or melt of unfused or "raw" material and of withdrawal of fused material from the charge or melt, for casting or solidification and crystallization, without detrimentally affecting or disturbing the thermal conditions of the melt from which the fused material is withdrawn and without contaminating the fused material being withdrawn by admixture therewith of unfused or partially fused material. Another object is to provide a method of controlling and operating an electrical furnace for fusing high-fusing-point material and a series of molds or receptacles for receiving fused material from the furnace, in such a manner as to achieve efficient, lower cost, and substantial continuity of large-quantity production with repeated and successive employment of the molds or receptables. Another object is to provide a method for dependably and reliably correlating, for substantially continuous large-quantity production of crystallized or solidified fused material, like alumina, such factors as rate of feed of unfused or "raw" material to the electric furnace, rate and character of withdrawal therefrom into molds or receptacles, power input, cooling or solidification of the withdrawn material, and the like.

Another object is in general to provide an improved method and apparatus for the safe, dependable, continuous quantity-production of fussed high-fusing-point refractory oxides, such as alumina, having the desired ultimate qualities and characteristics, and capable of being economically carried on commercially. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings in which are shown one or more illustrative or preferred embodiments of the mechanical features of this invention, Figure 1 is a side elevation, partly diagrammatic and partly schematic, of a furnace installation;

Figure 3 is a front elevation, as seen from the right in Figures 1 and 2, of only the furnace and electrode structure, showing also certain features of the mounting of the furnace;

Figure 4 is a vertical sectional view, on a larger scale, of the furnace structure as seen along the line 4—4 of Figure 2, certain parts being shown in elevation and certain other parts being omitted;

Figure 5 is a vertical sectional view, on a larger scale, of the furnace structure as seen along the line 5—5 of Figure 2, certain parts being shown in elevation and certain other parts being omitted;

Figure 6 is a horizontal sectional view as seen along the line 6—6 of Figure 4, certain parts being omitted or indicated diagrammatically;

Figure 7 is a detached or fragmentary vertical sectional view, on an enlarged scale, showing certain relationships between the furnace lining and the pouring spout as seen along the line 4—4 of Figure 2;

Figure 8 is an elevation on a larger scale as seen along the line 8—8 of Figure 1, showing certain structural relationships between the electrodes and the furnace hood structure;

Figure 9 is a vertical transverse sectional view, on an enlarged scale, as seen along the line 9—9 of Figure 8, showing in detail certain of the structural features inter-relating the electrodes and the hood structure;

Figure 10 is a detached or fragmentary side elevation showing certain features of construction of the sides of the hood;

Figure 11 is a vertical sectional view as seen along the line 11—11 of Figure 10;

Figure 12 is a diagrammatic representation of circuit and control arrangements for the energization and control of the electrical features of the furnace;

Figure 2:
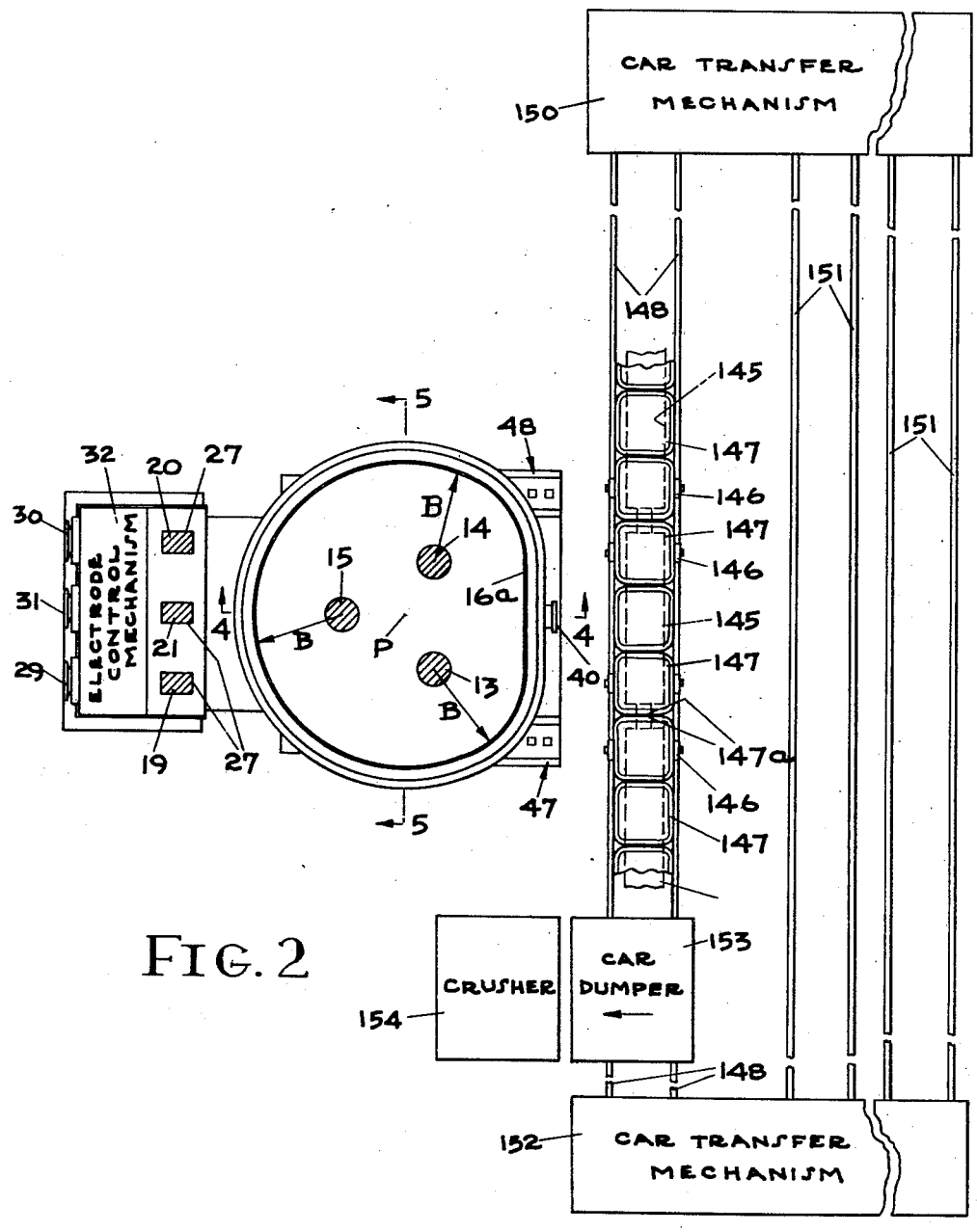
Figure 2 is a plan view of a furnace installation and of a preferred and illustrative coacting material-handling system, certain parts being shown in horizontal section or omitted and other parts being shown diagrammatically.
Figure 14:
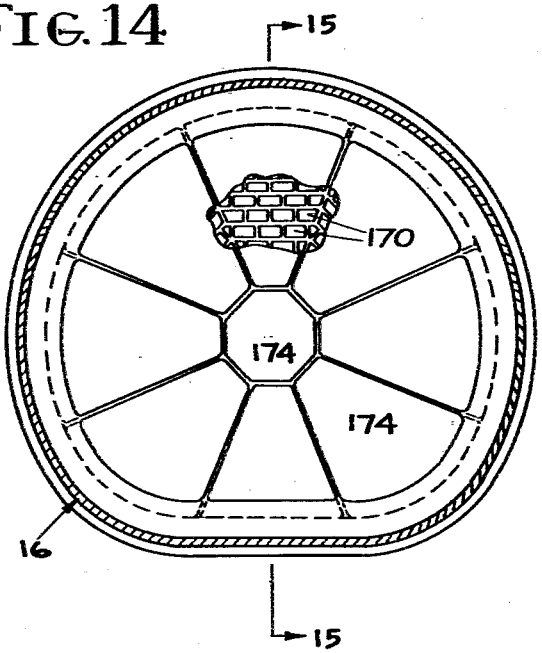
Figure 15:
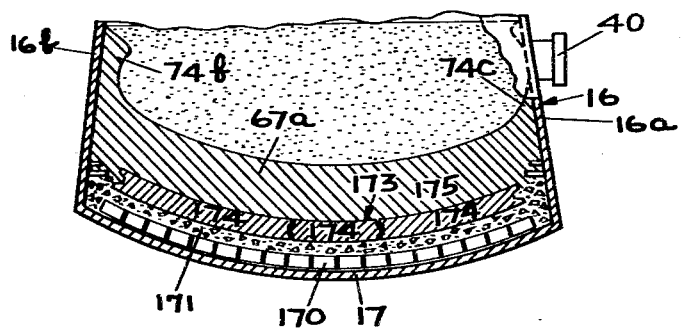

Figure 14 is a horizontal sectional view of the furnace shell to show in elevation, with certain parts being broken away, one stage in the construction of a modified form of bottom lining, and Figure 15 is a vertical sectional view as it would be seen along the line 4—4 of Figure 2, the view being partly broken away and partly shown in elevation, showing the completed bottom and side lining for the furnace shell, and being therefore a transverse vertical section along the line 15—15 of Figure 14 in the final stage of completion of the bottom and side lining.

Similar reference characters refer to similar parts throughout the several views of the drawings.

Figure 1:
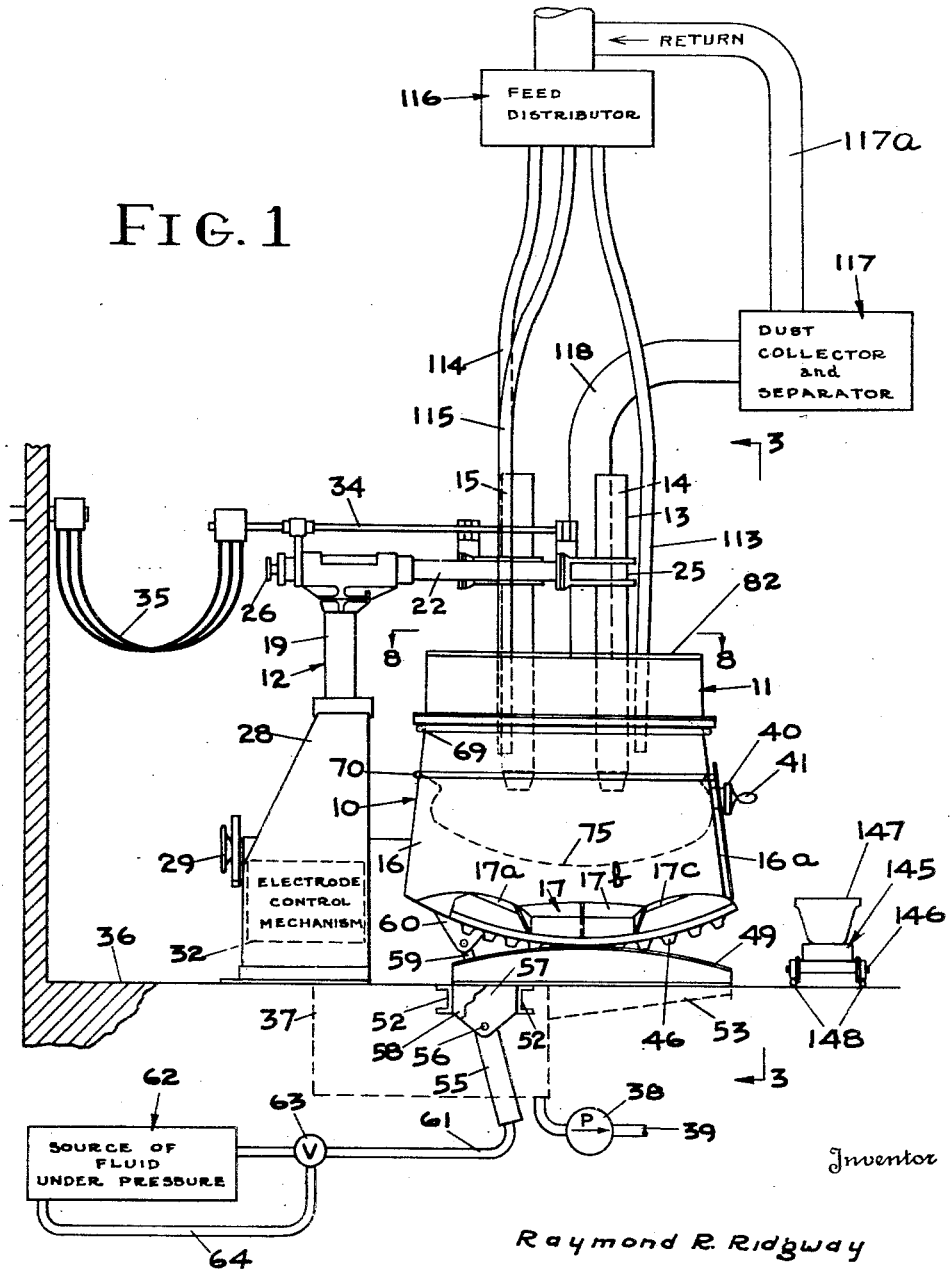

Referring to Figures 1, 2 and 3, the furnace comprises a shell generally indicated by the reference character 10, preferably also a top closure or hood generally indicated by the reference character 11, and an electrode assembly, mounting, and control, all generally indicated by the reference character 12, with the electrodes, which are three in number where 3-phase electrical energy is to be employed and which are indicated by the reference characters 13, 14 and 15, projecting downwardly into the interior of the shell 10 which, in turn, is preferably constructed and mounted to be tiltable and to have preferably certain thermal relationships to the electrodes and to certain other parts, all as later described. It is within the furnace shell 10 that continuous fusion of high-fusing-point material, such as alumina, is to be effected in certain later-described relationships to preferably continuous feed of unfused material thereto and to withdrawal of fused material therefrom.

The shell 10 is preferably made of suitably heavy sheet steel and, while provided internally, at least throughout certain portions thereof, with a suitable refractory lining as later described, it nevertheless has to be protected against excessive temperature rise therein, particularly where the material to be fused is alumina, which will hereinafter be used illustratively and which has a temperature of fusion or melting point on the order of 2,000° C. Such protection I provide by flowing continuously over its external surfaces a good heat-abstracting-medium, such as water, and to that end, as well as to achieve certain other coactions and advantages later described, I prefer to give the shell 10 a generally frusto-conical shape as by correspondingly forming or building up its side shell 16 and by giving its bottom 17 a shape substantially like a segment of a sphere preferably of a radius having a preferred relationship, later described, to certain other thermal relationships within the furnace 10. With such shape, water may be continuously sprayed or flowed onto the exterior surfaces of the furnace shell 10, with cumulative protective action as is later described.

Sheet steel comparable to boiler plate may be employed in building up the shell 10 and joints or junctions are preferably butt-welded to give relative smoothness of surface, both exteriorly and interiorly and, while the spherical segment making up the bottom shell 10 is preferably of a single piece, it may be built up of sector-shaped segments, three of which, 17ª, 17ᵇ and 17ᶜ are visible in Figure 1, welded together and peripherally welded to the bottom periphery of the side shell 16.

In order to achieve relationships and coactions later described, one portion of the side wall, indicated at 16ª in Figures 1, 2 and 3, while still sloping downwardly and outwardly as do the remaining curved side wall portions 16ᵇ, substantially straightens out in horizontal cross-section (see Figure 2), forming a preferably plane wall portion that merges tangentially into the curvature of the curved portions 16ᵇ which can be and preferably are of substantially the same radius; this flattened-out wall portion 16ª I shall hereinafter call the "front" wall of the furnace shell 10. In effect, therefore, the preferred form of the side shell 16 is, geometrically speaking, circular throughout substantially 270° (the curved wall portion 16ᵇ) and substantially straight along a chord which subtends substantially 90°, thus to form the front wall 16ª. In Figure 2, the center or vertical axis of curvature of the curved wall portion 16ᵇ is indicated by the point P and where three electrodes 13—14—15 of graphite, or the like, are employed, they are preferably arranged vertically with their vertical axes respectively at the apexes of an equi-lateral triangle having one of its sides parallel to the straight front wall 16ª and with the apexes of the triangle and hence the centers of the electrodes equi-distant from the nearest points in the curved wall portion 16ᵇ of the side shell 16; that is to say, in the preferred arrangement, the distances B, indicated in Figure 2, are equal or substantially so. The electrode mounting and assembly 12 is therefore, in the preferred form, constructed to support and position the electrodes relative to the furnace shell 10 to achieve the relationships just described and also others later herein set forth.

The electrode mounting 12 may be of any suitable or desired detailed construction and, illustratively and preferably, I provide individual supports, preferably and individually movable and controllable, for the respective electrodes. Thus, where the latter are three in number, I may provide three vertically movable masts 19, 20 and 21 provided with suitable horizontal cantilever arms or jibs 22, 23 and 24, respectively, each supporting an electrode in its outer end by any suitable insulatingly mounted and preferably water-cooled clamp, generally indicated by the reference character 25; each clamp is preferably also provided with any suitable means, such as a hand-wheel-and-screw, generally indicated at 26, for releasing or tightening the clamp on the electrode, so that each may be initially set, or subsequently re-set downwardly as it is consumed during operation, in order thereby to achieve the same lengths of the three electrodes projecting downwardly from the jibs 22, 23 and 24. With the latter set in substantially the same horizontal plane, the lower ends of the electrodes are likewise in substantially the same plane transverse of the axis P of the furnace shell 10.

The three masts 19—20 and 21 are suitably supported and controlled for up and down movement, for either manual, or motor-operated, or automatic actuation thereof, not only for purposes of initially mounting the electrodes in the jibs or of subsequently setting them downwardly with respect to their clamps, but also for purposes of setting them, during operation of the furnace, properly with respect to the charge and for maintaining them in appropriate relationship to the charge during variations in quantity of the latter or changes in condition that might take place during the operation of the furnace; thus the three masts 19, 20 and 21 may be polygonal in cross-section (Figure 2) and extend downwardly into suitable guideways 27 provided in a casing-like standard 28 which is preferably constructed and mounted separately from the furnace structure 10—11 and which can contain appropriate apparatus and mechanisms of known form, such as cables, pulleys, winches, motor drives and hand-wheel drives therefor for effecting movement and control in up and down direction of the masts in the manner above described; such mechanism may take any known form and hence is not shown and of this mechanism only three hand-wheels 29, 30 and 31 are shown in Figures 1 and 2, the remainder of such mechanism being diagrammatically indicated at 32.

Suitable means, also of known form, are provided to lead electrical energy to the electrodes; thus each mast may carry, in suitable insulating supports, a heavy water-cooled conductor 34 connected at its one end electrically to the clamp that holds the electrode and provided with means at its other end for making electrical connection by way of heavy flexible conductors 35 to the power supply circuit, the flexible conductors 35 permitting freedom of up and down movement of the electrode masts while maintaining the electrical connection thereto.

At 36 in Figure 1 is shown the floor line of the installation and I provide a pit or sump 37 with respect to which the mast supporting standard 28 may be mounted in overhanging relation so as to permit the masts 19, 20 and 21, if necessary, to descend and project downwardly below the base of the standard 28 where, as is preferred, substantial downward movement of the electrodes and jibs is desirable. The pit 37 preferably extends toward the front of the furnace structure, that is, to the right in Figure 1, illustratively to a point materially short of the vertical axis P of the furnace shell 10; into the sump 37 is to be drained the water that runs off of the exterior surfaces of the furnace shell 10 and from the sump 37 the water is continuously removed as by a pump 38 of any suitable construction and drive, and preferably the drain-off, as by the pipe 39, from the sump 37 takes place by gravity so that drainage is achieved without risking a failure in the drive of the pump.

The furnace shell 10 is preferably constructed and mounted so as to normally rest in upright or vertical position, that is, with its axis P vertical, and to be tilted at will in the direction of the above-mentioned flattened-out front wall 16ª in which is mounted, preferably in the manner later described, a refractory pouring spout 40 with a removable and preferably refractory plug or closure 41, both being preferably made of graphite, so as to effect pouring of liquified contents from the furnace.

Accordingly and illustratively, I provide a suitable number, illustratively two, spaced arcuate rockers 42 and 43 (Figures 1, 2 and 3) secured to the bottom shell 17 preferably in a manner to strengthen the latter and to provide for good distributed support of the load represented by the furnace structure and its contents. Thus each rocker may comprise parallel spaced steel plate elements 44 (Figure 3) shaped to fit the curvatures of the bottom shell 17 to which they are welded in spaced relation, the pair of plates 44—44 of each rocker being bridged by an arcuate plate 45 welded thereto and provided on its downward face with spaced teeth 46 (Figure 1).

The two spaced rockers 42 and 43 rest, respectively, upon two similarly spaced truss-like supports 47 and 48, respectively, which may also be built up out of sections welded together, each having an upper supporting plate 49 preferably upwardly convex and provided with holes 50 spaced appropriately to receive the teeth 46 of the furnace shell supporting rockers so as to prevent displacement of the furnace structure during rocking or tilting movement, the truss-like guideways 47 and 48 having suitable base plates 51 for resting flatwise against a suitable foundation and for securing them thereto, preferably in position to overhang the sump 37 (Figure 1), the overhanging portions being supported, if desired, by cross-beams 52 extending across the sump 37.

Throughout a substantial area greater than the lateral expanse of the furnace structure, excepting for the foundation portion underlying the supporting guideways 47—48, the foundation or flooring is shaped in the form of a shallow pit or basin 53 that slopes downwardly toward and into the pit 37 so that water running off the furnace shell 10 that does not drip directly into the pit 37 is caught in the shallow basin pit 53, the slope of which insures quick run-off into the pit 37.

Suitable means are provided for effecting tilting of the furnace structure out of and back into its normal vertical position. Preferably, the shape or curvature of the top plates 49 of the fixed guideways 47 and 48 is such, in relation to the curvature of the furnace shell rockers 42—43, that, for any position of the furnace shell out of its vertical position and within the desired range of tilting, the center of mass of the furnace structure and its contents remains always on that side of the vertical plane through the lines of contact of the rockers with the guideways as to return the furnace structure always to its normal vertical position; to tilt it out of its vertical position, that is, clockwise as viewed in Figure 1, I preferably employ any suitable reversible driving mechanism, that is, a mechanism so constructed that it may be actuated in tilting direction by the source of motive power employed and does not resist being actuated or driven in reverse direction when the motive force is the force exerted by the mass of the furnace structure operating through a lever arm that is measured by the above-mentioned spacing of the center of mass from the vertical plane through the lines of contact of the rocker supports with the guideways. With such a mechanism, the application of the source of motive power achieves tilting in clockwise direction in Figure 1 as may be desired for pouring from the spout 40 and achieves restoration of the furnace structure to normal vertical position for cessation or halting of pouring when the source of motive power is released or removed at will or even when failure of that source of motive power takes place. Thus shut-off of pour of the high temperature fused and liquid material, as by tilting the furnace structure back to normal, thus to permit the insertion of the closure plug 41 in the spout 40 or to bring the discharge opening in the spout 40 above the level of the liquid material within the furnace, may be effected with complete safety and control even if failure of the source of motive power for tilting the furnace takes place.

A suitable and illustrative form of such mechanism may comprise a fluid-pressure-operated mechanism, preferably hydraulic, and may include a cylinder 55, pivotally mounted by trunnions 56 (Figures 1 and 3) supported in suitable bearings in spaced plates 57 and 58 secured as by welding to the cross-beams 52–52, and having therein a piston whose connecting rod 59 is pivotally connected by a suitable bracket structure 60 preferably bridged across and secured as by welding to the rocker supports 42—43. To the lower end of the cylinder 55 is connected a flexible conduit 61 leading to a suitable source, diagrammatically indicated at 62, of liquid, such as oil under pressure. A suitable valve, diagrammatically indicated at 63, is constructed and arranged so that when set in one position, liquid under pressure enters the cylinder 55 to start tilting the furnace structure, when set in the next position it shuts off the liquid under pressure and prevents escape thereof from the cylinder 55 and thus effects holding of the furnace in tilted position against the action of its own weight in tending to return it so that thereby the furnace may be held in tilted position for as long as is desired, but when the valve 63 is set in its next position, it connects the conduit 61 to a by-pass or return conduit 64 which leads to the low pressure or sump side of the fluid-pressure source 62, thus permitting escape of liquid from the cylinder 55 and permitting the weight effect of the furnace structure to tilt the latter back to normal vertical position, the latter action forcing the piston in the cylinder 55 in retrograde direction to eject the liquid by way of the conduits 61 and 64, and thus readying the hydraulic mechanism 55 for a subsequent tilting actuation of the furnace structure under the control of the valve 63.

Failure of the drive of the pump embodied in the fluid-pressure mechanism 62 will thus be seen not to interfere with the return tilt of the furnace for all that need be done is properly to set the valve 63 to its third above-described position.

By means of the valve 63 the extent of tilt may be controlled, as will now be clear. Thus the valve may be actuated to give a certain desired degree of tilt to effect commencement of pouring, and as pour continues and change in head of the high temperature liquid material in the furnace may require change or adjustment in the tilt, appropriate manipulation and setting of the valve 63 readily achieves the desired tilt or change in tilt.

Within the furnace shell 10, I provide a suitable lining of suitable refractory material; according to certain features of my invention and with certain controls and coactions later described, this lining need not be throughout the entire interior of the furnace shell 10 and I am enabled to leave the upper inner wall portions of the latter free from a lining, thus simplifying construction and maintenance. Where the material to be fused is alumina or the like, I provide a lining, preferably of the same material as the material to be fused, namely, in the illustration, alumina, and preferably I employ pure previously-fused alumina, utilizing alumina that has been previously fused and hence shrunk so as to gain the advantages of maximum density alumina for constructing the lining.

Previously-fused alumina is crushed into lumps which range in size from about 3″ to sizes as small as grit size 150; after crushing it is screened and thus segregated into graded sizes. The resultant lumps are fitted together and superimposed upon one another and the interstices therebetween filled in with smaller sizes, including also the smaller and smallest grit sizes, and in this way a relatively massive lining is manually built up to cover the bottom 17 (see Figures 4 and 5) to a depth of about 30″, with the surface thereof substantially flat or even concave to substantially follow the contour of the bottom 17, as indicated by the broken line 65, and if desired it may also be built up upwardly about and against the inside faces of the wall portions 16$^b$ and 16$^a$ of the side shell 16, as indicated by the broken line 66, whereby it is of substantial concavity. If built up to have concavity, it is preferable to maintain substantial concentricity with the vertical axis P of the furnace shell 10, and lining preferably tapering off against the side walls 16$^b$ and 16$^a$, the upwardly tapering portion against the front wall 16$^a$ being thinner than the corresponding portions tapering upwardly against the curved side portions 16$^b$, because of the geometric relationship of these walls as above described and as appears also from Figure 6. Also, it is preferred to first lay against the inside of the concave bottom shell 17 a bed or layer of granular alumina within which to seat or bed the lowermost layer of the lumps as the lining structure is thus manually built up.

The thus built-up preliminary lining structure is now ready to be converted for later functioning and that I achieve by subjecting it to controlled fusion under the action of the above-described electrodes but since, in so treating it, it is desirable to employ the water-cooling that is to function on the external surface of the furnace shell 10 during subsequent operations of the furnace anyway, the means for achieving such water-cooling may at this point be briefly described. Preferably, such means comprises an upper pipe or conduit 69 (Figure 1) that surrounds the upper external portion of the side shell 16, being suitably mounted by suitable brackets and having holes in it to discharge water inwardly and downwardly against the downwardly and outwardly sloping external surface of the side shell 16, thus covering the latter with a downwardly moving film or sheet of water. Partway down and just above the spout 40 is another pipe 70 similarly constructed and mounted and through numerous holes discharging additional water against the external face of the side shell, thus insuring adequate heat-abstracting capacity and also to compensate for loss of water due to evaporation. Extending parallel to the rocker supports 42 and 43 and also in between the plates 44—44 of the latter is a series of pipes 71 (see also Figure 3) supported in any suitable way by suitable brackets against, or suitably spaced from, the curved bottom shell 17 to the curvatures of which the pipes substantially conform. These pipes have upwardly and outwardly directed holes to spray continuously streams of water against the underface of the bottom shell 10. These pipes as well as pipes 69 and 70 above mentioned are connected through suitable connections, including a flexible conduit (not shown) to a suitable source of water under pressure so that they may discharge water against the entire external surface of the furnace shell 10, even though the latter be tilted. At the front of the furnace shell 10 and spaced away from the plane front wall 16ª is suitably supported a shield plate 73 of metal to prevent water that runs along the spout construction from becoming commingled with material being discharged during tilting of the furnace. The shield or guard plate 73 is welded to a metal sleeve 72 that is welded into an opening in the front wall 16ª (Figure 4) and within which is removably supported, as later described, the graphite discharge spout 40 above mentioned.

With the built-up and pieced-together bottom and lining structure now in place as above described, and with the cooling water applied, graphite resistor elements in the form of bars or rods are now laid upon the inserted bottom structure to form resistance paths between the lower ends of the electrodes 13, 14 and 15 which are brought down to engage them and also to substantially contact the built-up bottom structure; the resistors thus become effective, when the electric circuits to the electrodes are closed, to start arcing between adjacent electrodes, thus commencing the heating of the pieced-together alumina structure which begins to fuse in its uppermost layer regions and thus becomes conductive, permitting the removal of the graphite resistor elements. During this preliminary heating-up stage, it is desirable to pour on top of the pieced-together structure a quantity of fine grit or pulverized material of the same character, such as pure fused alumina, which under the heat of the arcs becomes fused and liquid and thus facilitates commencing the operation of treatment of the inserted pieced-together bottom structure for ultimate permanent use; the "melt" of this powdered material will thus be seen also to facilitate starting the fusion or melting of the uppermost layer-like portions or strata of the lump-form of lining, and a considerable charge of such fine grit or pulverized material may be added for these and other purposes about to be described.

In either case and with the fusing started, fusion is continued, but at a controlled rate and at a rate of power input to the electrodes which, in the illustrative size and capacity of furnace here described, is less than the normal or usual rate for operation upon an average ultimate furnace charge of raw or unfused material. Thereby the inserted lump form and pieced-together structure is slowly and progressively brought to fusion, the progression of fusion throughout the mass proceeding downwardly toward the bottom shell 17 but being halted at a point short of reaching the bottom shell 17, thus to leave a layer or strata of unfused material of suitable thickness immediately adjacent the bottom shell 17, as is indicated at 68. In the course of this fusion, the lumps and pieces lose their identity and become molten excepting for the outermost layer or strata just mentioned, some of the lumps of which, particularly the innermost lumps, are partially fused or are in effect sintered together by the union of only fused superficial layer portions of the lumps themselves. As this fusion progresses downwardly and outwardly, it is aided by liquid or molten material, including the powdered material with which the furnace is charged as above mentioned, to an appropriate extent, at the commencement of the operation, for the liquid material tends to progress downwardly in whatever spaces or interstices are available between lumps to commence the fusion of the latter. The control of progression of fusion so as to prevent it from reaching the metal shell is preferably effected by manual control of the vertical positions of the electrodes and manual control of the power input to the latter, in order thereby to prevent fused or liquid and hence conductive alumina from being formed or brought into being in direct contact with the metal of the shell, for such contact would bring about arc-over and puncture of the metal of the shell.

The lower ends of the electrodes, even though the latter may be adjusted up or down during this processing, are of course maintained in substantially the same plane transverse to the vertical axis P of the furnace shell 10 and the bottom shell 17 is preferably concave and like a segment of a spherical surface to define a line taken in any vertical section, of which Figures 4 and 5 are illustrative, that is substantially parallel to or coincident with isothermal lines spaced downwardly from the plane of the ends of the electrodes. Or it might be said that, extending downwardly from the somewhat circular (as viewed in horizontal section as in Figure 6) region of maximum temperature encompassing the electrode ends and extending into the conductive fused or liquified material, there are upwardly concave geometrically somewhat similar isothermal surfaces or planes of progressively lessening temperature as the bottom shell 17 is approached, and it is to one of these isothermal planes, of a temperature materially below the fusion point of the alumina, that the bottom shell 17 more or less conforms in shape. This may be determined empirically and with a bottom shell 17 of maximum diameter of 11 feet where it joins the bottom of the frusto-conical side shell 16, the curvature of the spherical segment making up the bottom shell 17 can have a radius of 11 feet and this I have found gives appropriate or close enough coincidence with the desired isothermal surface or plane, for an ultimate bottom lining thickness of 30″ of alumina, to protect the metal of the bottom shell during subsequent continuous operation of the furnace for fusing alumina, with controls such as I later describe.

But during the fusing treatment of the inserted built-up lump form of bottom lining, this preferred concavity of the bottom shell 17 greatly facilitates the completion of the formation of the bottom for, as the earlier above-mentioned fusion thereof progresses downwardly, the fusion "front" advances along upwardly concave surfaces or planes geometrically generally similar to the above-mentioned isothermal surfaces or planes and hence there is a substantially uniform approach toward the metal of the bottom shell 17 of the downwardly advancing fusion of the alumina that is to form the bottom lining, and thus risk of arc-over to and puncture of the bottom shell is greatly minimized, and testing of the downward progress of fusion, as later described, greatly facilitated and simplified.

Thereby also, halting of the downward progress of fusion, as above mentioned, brings about substantial uniformity of thickness of the unfused or sintered-together layer 68 next to the bottom shell 17 itself.

The rate and extent at which fusion progresses downwardly toward the bottom shell 17 is, during the above process, tested periodically by means of a metal probe bar, which is put down into the furnace shell 10 (see Figures 4 and 5) through the upper end and thrust downwardly toward the bottom shell 17; the extent to which it enters the furnace shell 10 in downward direction, knowing the initial depth to which the bottom lining was initially built up in lump form (30″ illustratively), permits the determination of the depth to which the lumps and particles of the 30″ lining have become liquid, for the end of the probe is stopped by those lumps or portions that are still in unfused condition. If the progression of fusion is non-uniform, and that may be detected by noting, when probing, material variations in depth of liquid material, it means that heat energy is being put into the material at too great a rate, possibly in a manner to distort or materially change the shape of the concave isothermal planes, and that there is risk of a more rapid advance toward the metal bottom shell at one or more points than at others. If the rate of progression of fusion is too great, the risk might be run of a cumulative action which might prematurely bring the fusion "front" right up to the metal of the shell and thus cause arc-over and puncture. In such cases, the rate of heat withdrawal as by increasing rate of flow of water may be increased, but preferably the electrical energy input to the electrodes is diminished. In this way progressive fusion is achieved at preferably a slow and safe rate, with all factors capable of definite control, including the avoidance of cumulative action like that above mentioned and thus I achieve nicety of control of the point in the progression of fusion downwardly toward the bottom shell 17 at which it is to be halted and cut off. That point may be such that any desired thickness of unfused alumina remain in direct contact with the metal shell, for example, a layer of several inches in thickness.

Also, during the above-described operation, the tilt of the furnace shell 10 may be varied from time to time or the shell may be rocked slowly back and forth, either from time to time or during the entire operation of pre-forming the bottom and lining; this has the effect of improving symmetry of distribution of the fused portion of the lining and therefore has the effect of shaping the mass of the fused portion of the refractory lining.

If, during the process of forming the bottom, the lump form of alumina was laid in place to terminate in a top surface somewhat as indicated by the broken line 65, the initial and subsequent addition of substantial quantities of powdered alumina during the operation results also in the building up of a lateral or side lining upwardly against the side wall portions 16$^b$ and 16$^a$, as indicated at 74 in Figures 4 and 5, along cross-sectional lines indicated by the full lines 75 in these two figures. In a general way, the volume of material represented by the area included between the broken line 65, the full line 75 and the sides of the furnace shell may be said to represent the additional alumina added at the start and during the continuation of the bottom processing, and the resultant rather substantial concavity thus produced may be said to be the result of a progressive cumulative lateral building up out of alumina particles that are, as to some, fused together and as to others simply sintered together and as to still others, principally those most remote from the region of heat and hence up against the side walls of the furnace shell, a mixture of both types.

This lateral and upwardly tapering building-up operation proceeds somewhat in the following way: As the initially-added powdered material fuses to start the fusion of the lumps put in the bottom up to the line 65, a puddle of molten or liquid alumina forms in the middle central and more or less circular area just about encompassing the electrode ends as seen in Figure 6; this puddle, which is bounded laterally by the granular or powdered material and is or becomes covered over with more powdered or granular material as the latter is added, increases in volume and commences to flow or expand radially outwardly on the upper surface 65 of the built-up or lump form of preliminary bottom, and such lateral expansion or movement of the puddle may be aided by the above-mentioned rocking of the furnace.

As it expands radially outwardly, it moves into cooler regions, pushing ahead of it and toward the metal walls of the side shell 16 unfused granular material which thus serves always to protect the metal of the side shell during these actions. As the intensity of heat increases, the progression of the fusion not only proceeds downwardly as above described but also radially outwardly and by a combined fusing and sintering action, aided by the cooling effect of the water descending the outside surfaces of the side shell 16 in conjunction with the continued and progressive addition of powdered or granular alumina, the side or lateral lining portion 74 is progressively and gradually built up. This portion may, as above indicated, be mostly incompletely fused material, being not as solid or integral as is the ultimate bottom ingot 74 above described, and is principally a progressively built-up structure of fused and sintered alumina particles frozen together because they are thrust radially outwardly into regions of isothermal planes of temperatures too low to maintain them in fused condition and because also they are thrust laterally into the region of cooling effect of the external cooling water upon the side shell 16.

If, however, the bottom lining is initially built up as above described along the broken line 66, tapering it upwardly and outwardly against the side shell, granular or powdered form of alumina is also added at the start of the bottom-processing operation and may be added from time to time thereafter but in lesser quantity. Again a puddle is initially formed in the central lower portions of the bowl-like face 66 and as the puddle increases in volume, it progresses itself radially outwardly, aided if desired by the rocking of the furnace, and thus molten or fused alumina is in effect washed against and upon the laterally built-up preliminary bottom, enters the interstices, freezes therein and to the lumps and particles, communicates heat to them to facilitate such bonding together or sintering together, and these actions may be accompanied also by some fusion and some sintering together of at least the lumps and particles of the innermost layers or portions of the laterally built-up portions of the structure by heat derived directly from the action of the electrodes. This latter action is analogous to the downward progression of fusion toward the bottom shell 17 as above described, but is a radially outward or lateral progression which, however, is less complete due probably to the heat withdrawal by the descending water on the external walls of the side shell.

In either case, that is, whether the start is made along the broken line 65 or the broken line 66, the radial dimensions of the side shell are sufficiently great so that, with respect to the maximum power input needed to process the bottom ingot 67, complete fusion of the upwardly tapered side portions is not effected for otherwise the molten material thereof would seek its own level and thus the lateral lining portions would be destroyed. Thus, while up and down adjustment of the electrodes and accompanying control of voltage applied and of power input thereto have a major effect in the downward progression of fusion throughout the bottom lining layer, these factors have a lesser effect upon radially outward progression with a given relationship of electrodes to the radius of the side shell, and this is preferred in order to avoid risking complete fusion of the side shell linings and arc-over to and puncturing of the metal side shell itself.

Where adjustment of the three electrodes as to spacings from the side shell is possible or provided, they are adjusted or set to meet the above-described conditions which are satisfactory also, as later described, for the normal functioning of the furnace. A satisfactory relationship, for alumina, may comprise, with electrodes 12" in diameter in Figure 2, spacing them about 42" center to center and giving the distances B in Figure 2 a value on the order of 3 feet where the side shell has a maximum diameter at its base on the order of 11 feet and a minimum diameter (at the top) of about 10 feet.

Due to the shape of the isothermal planes or lines, the final lining, with a concavity somewhat as indicated in the full line 75 in Figures 4 and 5, is internally defined, by the surface 75 which is substantially a surface of revolution whose generatrix is moved about an axis coincident with the vertical axis P of the furnace structure, and since the front wall 16ª is (see Figure 2) straightened out along a chord as above described, the side shell lining is thinner at the flattened front wall 16ª as shown at 74ª than it is at the arcuate side wall 16ᵇ, as appears better in Figure 4, for reasons later described. In building up this thinner front wall lining 74ª, the alumina freezes onto the internally exposed surfaces of the graphite bushing 78 and in effect bonds itself thereto, and that bushing, as is better shown in Figure 7, and the spout element 40 are of a length to project inwardly beyond the front wall 16ª a distance equal to the minimum desired thickness of this thinner front wall lining 74ª, all as is later described.

When the desired depth of fusion in the bottom lining has taken place, the power input to the electrodes is cut down, and the electrodes raised, both at a suitable rate, or the power input is cut off, so as to commence solidification of the fused alumina from the walls of the furnace shell inwardly at a suitable rate, the water-cooling of shell 10 being continued to prevent undue rise in temperature of the metal shell and also to aid in the solidification, by which there is thus formed a solid ingot or monolith 67 (Figures 4 and 5) of fused but solidified alumina. Its downward and lateral boundary or demarkation is conformed substantially to an upwardly concave isothermal plane and is substantially a portion of a spherical surface spaced from the bottom shell 17 by the layer 68, being really a region of transition from the solid ingot 67 to the layer 68 of partially sintered-together and partially fused lumps and particles. Layer 68 is of the desired and controlled thickness as above described, and provides some degree of play or flexibility between the large integral or unitary lining block or ingot 67 and the metal of the shell to accommodate dimensional changes upon heating and cooling, such as occur during shut-downs or power input changes or changes in rate of heat-abstraction by the external water-cooling.

The solidification inwardly aids in forming the upwardly tapered side portions 74 of the lining and unsolidified alumina may be poured off or may be retained for subsequent furnace operation. The side portions 74 of the lining may comprise as above noted principally partially fused lumps or particles of alumina, fused or sintered together, and they may become added to or further built up during subsequent operation of the furnace as is later described. This portion extends upwardly and about the interior portions of the spout structure (see Figure 7); metal bushing 72 is welded into an opening in the inclined plane wall 16ª of the furnace shell 10, preferably with its axis at right angles to the vertical axis of the furnace shell, and the inner end of the metal sleeve 72 projects but very little, if at all, beyond the inner face of the wall 16ª. The welded junction between it and the wall 16ª and the welded junction thereto of the baffle or shield plate 73 are water-tight so that water running down the outside face of the wall 16ª can spread onto and over the metal sleeve 72 to prevent abnormal heating thereof and of the graphite spout element 40. Within the sleeve 72 is received a graphite bushing 78 which is internally tapered to removably receive the externally tapered spout element 40, and bushing 78 projects inwardly a substantial distance beyond the end of the sleeve 72 so as to be engaged and surrounded by and bonded to the lining portion 74ª.

It is about the inwardly projecting portion of the graphite bushing 78 that the lining material 74ª extends and becomes bonded or fastened, being in effect solidified thereagainst with sufficient security of fastening as virtually to hold the bushing 78 against removal from the metal sleeve 72. The graphite bushing 78 thus protects the spout element 40 against having fused alumina frozen against and onto it except for its small end face, and thus permits ease and facility of removal and replacement of the spout element 40 itself.

The passageway 79 in the spout element 40 is preferably tapered and is circular in cross-section; it may be of a length on the order of 12" and it is constructed to function as an orifice to substantially fix or control the rate of flow therethrough of molten or fused material. For that purpose, the inner end 79ª of the passageway 79 is of appropriate dimensions to function as an orifice and illustratively it may be of a diameter of 2". The outer end opening 79ᵇ of the passage 79 may be on the order of 5" in diameter. The taper is, accordingly, preferably substantial, to get a better orifice effect and also to provide a progressively increasing channel or passageway that leads away from the orifice 79ª and thus lessen resistance to flow of molten material and hence effect quicker rate of flow, particularly in the case of fused alumina where, according to my invention, it is desirable, where certain characteristics in the ultimate product are desired, to effect as little loss of heat content during pouring as is possible. Also the spout element 40 is of substantial wall thickness, increased by the thickness of the graphite bushing 78, being on the order of 3" or so, thus making for a lesser rate of heat loss therethrough from the high temperature of molten material being passed by the orifice 79ª.

With a discharge spout construction of the just-described character, I am enabled also to achieve the desired continuity of furnace operation even though, as above mentioned, changes in the structure and thickness of the lining portion 74ª (Figures 4 and 6) take place and replacement of the orifice-spout element 40 may be achieved with little or no material interruption in the continuity of the subsequent operation.

It should be noted that, during the processing of the refractory ingot or monolithic lining to prepare the furnace for subsequent operation, as above described and also during the subsequent operation of the furnace, the top closure or hood structure 11 (Figures 1 and 3) is preferably made to coact and to achieve certain unique additional advantages; in this connection, it might at this point be noted that the temperature and heat produced during both lining-formation and subsequent furnace operations are of a high order of magnitude, that during these operations protection has to be afforded to the upper portions of the metal side shell 16 which, as indicated in Figures 4 and 5, need not be lined, and that the addition of powdered form of material, such as granulated or finer-grit alumina, during the heavy and substantial and sometimes violent arcing that accompanies the operation of the electrodes presents additional difficulties and hazards. These and other matters and controls I am enabled to take care of in a thoroughly practical way with the aid of the just-mentioned hood structure.

This hood structure is preferably of a built-up construction and comprises a top plate or roof, generally indicated by the reference character 81 (see Figure 8) made of suitably heavy sheet steel and having a conformation substantially matching the outline of the upper edge of the side shell 16 of the furnace shell 10 and it may be reinforced or strengthened in any suitable way as, for example, a peripherally-extending structural steel member 82 of suitable cross-section, such as angle-iron, channel or the like, and by suitable transverse structural steel members, preferably of so-called angle section to which the plate 81 may be welded and which in effect form a frame whereby also the plate member 81 need not be in a single piece and hence may be in sections assembled and welded to the various elements of the frame. These transverse members preferably also function for other purposes, preferably in coaction with the electrodes 13, 14 and 15 which extend through the roof plate 81 which, for that purpose, is provided with openings or slots 83, 84 and 85, respectively, to permit the electrodes to project therethrough. These slots are wider than the diameter of the electrodes and are of substantial length in the direction of tilt of the furnace structure.

It is preferably with respect to the location of these slots 83, 84 and 85, as indicated in Figure 8, that the transverse frame elements are positioned. Thus two angle-sectioned transverse members 87 and 88, facing toward each other, extend parallel to each other and each along one side edge of the slot 83, being welded to the peripheral frame element 82 and to the roof plate 81, and in facing toward each other as better seen in Figure 9, they are thus made to form a pair of ways or guideways for slidably receiving and guiding a metal plate cover 90 which is of materially greater length than the electrode slot or opening 83.

The cover plate 90, in turn, has a round opening 91 therein through which the electrode 13 passes with ample clearance for electrical and mechanical reasons, and about the round opening 91 is secured a ring 92 which can be formed up out of angle-sectioned structural steel members and welded to the cover plate 90 to form an inwardly exposed annular seat 93 in which is received and seated a collar 94 made of a suitable non-conductive and semi-refractory material capable of withstanding substantial heat, and a suitable material may be an asbestos composition, such as "asbestos lumber." The collar 94 has an internal diameter materially larger than the diameter of the electrode that passes through it and here a clearance of 1 or 2" may suffice; its inner face is bevelled at top and bottom so as to avoid presenting for contact with the cylindrical electrode a surface of substantial axial dimension and so as to approximate in a general way a "knife edge" effect.

The slots 84 and 85 are provided in a similar way with slidable cover plates and insulating collar and since these parts are of similar construction and coact similarly with the electrodes 14 and 15, respectively, as do the corresponding parts just described in connection with electrode 13 and slot 83, these parts are similarly numbered in Figure 9 and need not be further described in detail, and the same is true of the pairs of transverse frame angle members 87 and 88 provided for each of the slots for guiding the respective cover plates.

The roof or top structure, such as just described, is made to overlie the upper otherwise open end of the furnace shell 10 and it is preferably supported by the latter, but in a position spaced upwardly from the upper edge of the shell by a distance on the order of about 2 feet. Such support may be furnished in any desired or suitable way and, illustratively, by a suitable number of suitably spaced vertical struts 96 which are preferably structural steel elements of any suitable cross-section, illustratively of channel cross-section, and are preferably welded to the roof structure at their upper ends and secured as by welding or preferably by bolting at their lower ends to a structural steel element 97, illustratively of angle section, as is better shown in Figures 10 and 11.

The element 97 is welded to the periphery of the side shell 16 at the inner portion of its horizontal web, the two parts thus giving the upper rim of the metal shell 10 substantial strength and rigidity. Moreover this arrangement, with the vertical web of the member 97 projecting downwardly and spaced from the side shell 16, forms an efficient shield and baffle to prevent water from the uppermost pipe or conduit 69 from splashing or moving over the edge of the shell and into the furnace and, conveniently and preferably, the pipe 69 is substantially housed in the space thus provided, as shown in Figure 11, its bracket support conveniently comprising suitable hook-shaped bolts 98 passing through one of the webs as shown.

The member 97 and shell 10, mutually reinforcing each other, thus also provide a strong foundation to which to attach the above-described roof structure. In the space between the latter and the upper end of the furnace shell 10 and between successive vertical struts 96 I mount, preferably removably or movably, side closure members which preferably take the form of doors 100 (Figures 3 and 10) preferably built up and suitably curved or approximately so to substantially conform to the curvature of that particular portion of the upper rim of the furnace shell which they respectively overlie so as to form substantially an upward continuation thereof, and the vertical struts 96 are preferably appropriately spaced to provide, when the doors are open, openings of substantial peripheral extent. Thus, for example, the periphery to be closed by the doors may be divided into six, eight or ten spaces by as many vertical struts 96 to be closed by a corresponding number of doors 100.

As indicated in Figure 10 and also in Figure 3, each strut 96 forms a post to which the hinges 101 of one door may be secured and to which one element of any suitable latch structure 102 may be secured for latching the next adjacent door in closed position.

The doors are hung and dimensioned so that they fit relatively snugly along their top edges underneath the roof structure or frame, when in closed position, and leave a substantial space, indicated at 104, between their lower edges and the upper rim of the furnace shell 10, a space on the order of, say, 5″. The doors 100 are preferably constructed in any suitable way to be resistant to the transmission of heat and thus, referring to Figure 10, each door may comprise a built-up frame 106 of channel cross-section, thus providing two spaced webs 107 and 108 to which are secured and by which are held in spaced relation wire screen sheets 109 and 110, respectively; the spacing between the latter is substantial and hence the outer screen 110 does not reach the temperature of the inner screen 109.

The doors 100 are large enough to give access into the interior of the furnace for building up the bottom lining as above described and for subsequent maintenance purposes, such as replacement of electrodes. During the operation of the furnace, they are kept closed and their insulation action makes it possible for an operator, standing on an elevated platform (not shown), to work in such close proximity to the furnace, and with comfort and safety, to insert an L-shaped metal probe, earlier above mentioned, through any of the spaces 104 under the doors and hence into the furnace to project it into the bottom undergoing processing or into the subsequent production "melt" to determine the depth of the fused or molten material; as the probe is withdrawn, fused material "freezes" to it and by measuring the portion of the probe covered with frozen material, the condition being tested can be determined. Or, if desired, any door may be opened for this probing operation and it is by way of opening a door that the operator may, by a suitable tool, shift or redistribute "raw" or unfused material being fed to the furnace, should such action be desired. Access in this manner may be gained throughout the entire periphery of the furnace, though in practice these operations can be carried on adequately from one side station of the furnace.

At suitably distributed points, preferably three in number where three electrodes are employed for 3-phase operation and, illustratively, at approximately the mid-points of the sides of the equilateral triangle (Figure 2) formed by the electrodes, I pass through suitable openings in the top plate 81 of the roof structure three preferably flexible conduits, such as flexible metal hose, indicated at 113, 114 and 115 in Figures 1, 2 and 8, providing them with suitable bushings (not shown) of suitable refractory material where they pass through the top plate 81 and thereby also secure them to the latter, but in position to allow suitable lengths of them to depend downwardly within the hood structure, generally parallel to the electrodes and to an extent where they terminate just about in the plane of the top edge of the side shell 16.

At a suitable point above the furnace structure, they are connected to any suitable arrangement or means, preferably controllable or regulatable at will in any suitable way, for substantially equally supplying the feed conduits 113—114—115 at substantially equal rates with raw or unfused material preferably in granular or powder-like form; such an arrangement and means are diagrammatically indicated in Figure 1 by the reference character 116.

It is by way of these conduits that the addition material, described above during the formation of the bottom lining, is controllably fed to the furnace and these feed conduits function also to supply, preferably continuously at a suitable rate, the material to be treated during the subsequent continuous operation of the furnace, and as later explained, they function to maintain, preferably controllably, a suitable blanket or top layer of unfused material overlying the "melt" to prevent substantial heat loss or heat flow upwardly from the melt, in effect forming a heat-insulating blanket or layer above the melt. It is this action that contributes toward making it possible to have some of the metal side shell unlined, both during formation of the bottom and side lining and during subsequent furnace operations; the side lining, as earlier noted, need not extend all the way to the top edge of the side shell; this insulating action also contributes toward the feasibility of an all-metal hood structure like that above described and to the feasibility of an operator working in close attendance upon and to the furnace.

But the supply of powdered or even granular material in this manner can give rise to dust production, aggravated by the fineness of the particle form in which the material is supplied, largely because of the substantial agitation of the material of the above-mentioned layer or blanket in the regions close to and around the electrodes, because of the agitation thereof caused by the arcs. Accordingly, I connect, at a suitable point or points, preferably as near the middle point as possible, in the top plate 81 (see Figure 8) a relatively large flexible conduit 118, of any suitable and preferably flexible material, such as flexible hose, providing the roof plate 18 with a suitable opening and with suitable means for securing the conduit 118 thereto. The conduit extends upwardly where it is connected to a suitable suction and separator means of any suitable construction and hence only diagrammatically indicated at 119 in Figure 1. The device 119, including some such means as a suction fan, thus draws air out of the hood structure at a suitable rate to carry with it particles of the in-fed material and of the above-mentioned blanket that are agitated or projected into suspension in the air, and in this connection the screen construction of the doors 100 (Figure 10) and the provision of the spaces 104 beneath them and also the spaces between the electrodes and the collars 94 (Figure 9) provide for adequate ingress of fresh air from the outside atmosphere, such ingress preventing egress of dust. The resultant movement of air takes with it suspended particles or "dust" and also some heat, thus contributing toward prevention of undue temperature rise in and within the hood structure itself.

During tilt of the furnace structure 10 during either bottom-lining formation or subsequent furnace operations, the hood structure 11 tilts with the furnace structure as a part thereof, but closure of the electrode slots 83, 84 and 85 (Figures 8 and 9) is maintained by their cover plates 90 which are held against movement by the non-tilting electrodes, the resultant relative movement being a sliding movement between the cover plates 90 and their respective guideways 87—88. During tilting movement, the looseness of fit between the insulating rings 94 and the electrodes, aided by the shape of the inner faces of the collars 94, avoids binding between the electrodes and the collars and insures nicety of the just-mentioned relative sliding movement of the other parts. The flexibility of the infeed conduits and of the dust-collecting conduit maintains continuity of their operation and action during tilting.

With the bottom and side lining formed as above described and the furnace otherwise ready for operation, a charge of granular or powdered material is fed to the furnace and on top of the integral or monolithic lining, the electrodes are let down, starting graphite bars or rods are inserted and the electrical energy turned on, whence arcing commences followed by progressive fusion of the mass of the charge, the starting graphite rods being preferably removed after starting is completed. Progressively, and by continuing the feed of material through the infeed conduits 113—114—115, a "melt" or molten mass is built up or produced to a substantial depth above the bottom-lining monolith or ingot 67, for example, a depth on the order of about the height of the orifice-spout element 40 whose vertical position, as shown in Figure 4, is related to certain of the thermal conditions brought controllably into existence during the operation of the furnace and to the approximate capacity at which the process and apparatus are to operate. With a furnace shell 10 structurally dimensioned on the order of those dimensions above mentioned and with the side shell 16 having a vertical dimension of about 6 feet, and for a capacity on the order of 5,000 or 6,000 pounds of fused alumina per hour, the orifice-spout 40 is positioned about 2 feet down from the upper edge of the side shell; with a maximum thickness of 30" of pre-formed bottom lining (the solid mass 67 in Figures 4 and 5), this would mean that the melt is produced or built up as above described to a quantity of about 12,000 pounds or about 6 tons, whence tilting of the furnace out of normal vertical position and for pouring through the orifice-spout 40 may be commenced.

Of this molten mass, only a portion is drawn off during the tilting and where the melt is on the order of 12,000 pounds, the portion drawn off, in a detailed manner later explained, is only about one-third, namely, about 4,000 pounds. This is set forth as illustrative and the portion drawn off may be varied throughout some range, having due regard for the controls that I effect during the production of the melt and during subsequent building up of another melt in which the deficiency caused by the portion drawn off, is made up.

Bearing in mind that, in the case of alumina, the melting point is exceedingly high and that reliance is placed upon the same material, namely, fused alumina for preventing any of the melt or any fusion from proceeding to the metal shell itself, the factors of energy input to the electrodes, the voltage applied thereto, and the vertical elevation thereof are, and can be, I have discovered, so controlled and interrelated, checked by probing as earlier above described, as will maintain the bottom-lining ingot 67 (illustratively 30" thick) with its integral built-up side lining portion or extension 74, intact and uninvaded by any, or any material, fusion, throughout long-continued operation over a period of months, thus avoiding damage to the metal shell of the furnace. According to my invention, it is possible to maintain the dimensions of the lining structure, particularly the thickness of the bottom-lining ingot 67, within as close limits as may be desired, against various variables, including such factors as change in conductivity of the material undergoing treatment, the efficiency of melting or fusion, or even change in temperature of cooling water initially supplied to the external surfaces of the furnace shell 10, or if desired, the lining thickness may be increased, or even decreased under control, though to decrease it in thickness would be to lessen the factor of safety initially decided upon. In effect, I effect control of the electrical factors in such a way as to insure that the curved and upwardly convex plane or surface 75 (Figures 4 and 5) coincides, or substantially so, with that isothermal plane or surface that is of a temperature, in relation to other and generally geometrically similar isothermal planes or lines in the body of the melt itself, just below the fusion point of the material in question, such as alumina. If that isothermal plane or line is not permitted to progress downwardly below that indicated by the line 75 in Figures 4 and 5, melting or fusion of the lining does not take place and its dimension is retained; if conditions change so that that isothermal plane or line moves upwardly, the thickness of the lining is added to.

The molten material is conductive and its resistance to current flow from one electrode to another is one factor, while the contact resistances, each usually in the form of an arc, between the molten material and each electrode of any pair of electrodes represent two additional factors, the three resistance factors being in series in the path from one electrode to its coacting electrode. I have discovered that the shape and curvature of the isothermal planes or lines is variable in accordance with the relationship between these resistance factors. For example, it is possible to have such a relationship between them that, looking at Figures 4 and 6, the bottom ingot 67 can be built up in thickness in a somewhat conical form coaxial with the axis P or, conversely, can be thinned down in a somewhat annular depression underlying a circle drawn through the centers of the three electrodes, leaving an upstanding somewhat conical central projection coaxial with the axis P.

The relative values of these factors can be changed by raising or lowering the electrodes, thereby altering the contact or arc resistance factors, and with constant current flowing in the circuit of any pair of electrodes and hence through the three series resistances, the heating effects produced by any two electrodes in the respective regions where the three resistance factors are present may be varied. For example, the measure of the heat effect is $I^2R$, and for a given power input, that portion of it that appears as heat energy in the resistance factor of the molten material itself can be increased or decreased as the contact or arc resistance factors are decreased or increased, respectively.

Accordingly, should the isothermal plane or line 75 (Figures 4 and 5) start moving downwardly so as to cause fusion to invade the bottom-lining ingot or monolith 67, and this action is detectible by periodic probing as above described, corrective action is taken and this may be achieved in various ways. For example, the electrodes may be moved upwardly, thus to increase the arc-resistances and, assuming a fixed applied voltage, the current and hence power input diminishes correspondingly, the total or overall production of heat diminishing inversely as the square of the current and directly as the increase in resistance. Increase in the arc resistances, in relation to the resistance of the molten material itself, effects, it will be seen, a redistribution of heat energy in that a lesser amount is directly produced in the molten material itself, and a greater amount is produced in the upper or surface portions thereof and thus also more heat energy is directed to the unfused material that forms the above-mentioned blanket and which is continuously being supplied through the infeed conduits 113—114—115. Stated differently, these actions halt the downward progression of the isothermal plane or line 75. A broadly similar halting of downward progression may be effected by cutting down on the current and hence power input by any suitable means as, for example, by cutting down on the applied voltage, leaving the electrodes more or less in the same position. Should the probing indicate that the curved isothermal plane or line 75 is moving upwardly, so as to increase the thickness of the bottom-lining ingot or monolith 67, reverse corrective steps are taken, as will now be clear.

However, for achieving better efficiency and also continuity of rate of operation, I prefer to employ corrective controls that avoid substantial fluctuations in power input, with accompanying necessary changes in infeed of unfused material, as would be the case if the above-described corrective controls are employed, thus also achieving the advantages of substantial continuity of electrical load or demand. Such preferred controls can be effected manually, but preferably are effected automatically; in a preferred mode of operation, I maintain substantial constancy of current input at selected standards, for any one of which the positions of the electrodes are varied to achieve current constancy, and the applied voltage may be different for each standard of current constancy. To the resultant substantial constancy (for any selected standard of current constancy) of heat energy produced in the furnace I am enabled to correlate thereto a corresponding steady or continuous rate of infeed of unfused material through the infeed conduits and also maintain the resultant progressively increasing mass of the melt in proper molten condition for periodic but continuous pouring of a portion thereof through the orifice-spout 40, while at the same time maintaining integrity of both the bottom-lining ingot 67 with its integral side lining extension 74.

In this preferred method, referring now to the diagrammatic showing in Figure 12, the electrodes are connected to a suitable source of alternating current energy and in the case of a 3-electrode furnace, the source is polyphase and is preferably 3-phase, the 3-phase energy being supplied from a suitable source, preferably through step-down transformers provided with suitable means whereby the output voltage applied to the electrodes 13, 14 and 15 may be varied. Thus, I may employ three transformers $T^1$, $T^2$ and $T^3$ whose high-voltage windings $H^1$, $H^2$ and $H^3$ may be connected in any suitable polyphase arrangement, such as the delta connection as shown, to the polyphase source by suitable conductors 115—116—117; preferably I provide also any suitable switching and automatic cut-out means for controlling the main power circuit and for cut-out upon overload, and such a means I have shown diagrammatically at 119.

The low voltage windings $L^1$, $L^2$ and $L^3$ may also be given any desired polyphase connection such as the delta connection shown, and connected by conductors 122, 123, and 124 to the three electrodes as indicated in Figure 12.

The control apparatus 32 includes, as above mentioned, a suitable means for raising and lowering the electrode masts 19, 20 and 21, individually, each preferably motor-operated and relay-controlled in any suitable or known manner; they are diagrammatically indicated at 125ª, 125ᵇ and 125ᶜ and collectively by the reference character 125 in Figure 12. Each electrode control I arrange for manual control, and preferably also to be automatically controlled or actuated, preferably in response to current flowing to the electrodes and hence, conveniently, in response to current flow in the respective phases. Such automatic controls can be substantially identical for each electrode mast, and hence it will suffice to describe in detail only one of them, the corresponding elements of the others being indicated by the same reference characters distinguished by correspondingly different exponents; thus, for the phase leading to electrode 15, I may provide a current-responsive coil or winding 126ª connected by conductors 127ª—128ª to a device 130ª which may be a suitable low resistance but is preferably a current transformer having its primary connected in the low voltage conductor 124 leading to the electrodes 15 and having its secondary connected to the winding 126ª so that changes in current flow in conductor 124 are reflected in the winding 126ª which, through suitable means such as an armature 132ª, adjustably biased by an adjustable spring 133ª may be made to close a circuit at contact 134ª upon increase in current above the desired value and close a circuit at contact 135ª upon decrease in current from the desired value. These contacts are connected by conductors 136ª and 137ª to the raising and lowering mechanism 125ª for electrode 15, being connected in circuit with a suitable source 138 of operating voltage, by conductors 140ª and 141ª.

In like manner, monitor windings 126ᵇ and 126ᶜ respond to current changes in conductors 123 and 122, respectively, by way of the transformers 130ᵇ and 130ᶜ connected in the circuit of these conductors, for controlling the raising and lowering mechanisms 125ᵇ and 125ᶜ for the electrodes 14 and 13, respectively. So long as the desired current value exists in each phase, the armatures of the monitor windings can assume and retain a "neutral" position, that is, a position intermediate of their respective contacts, and mechanisms 125ª, 125ᵇ and 125ᶜ hold their respective electrodes at rest.

The mechanisms 125ª, 125ᵇ and 125ᶜ, however, move their respective electrodes upwardly when their respective control or relay circuits are closed at contacts 134ª, 134ᵇ and 134ᶜ, and move them downwardly when closed at contacts 135ª, 135ᵇ, and 135ᶜ, in each case to restore the current values in the three phases to the desired value.

Each of the mechanisms 125ª, 125ᵇ and 125ᶜ may comprise, as above indicated, a winch operated by a reversible motor which is preferably a direct current motor in which case the just-mentioned contacts operate suitable relays in such manner that the polarity of current supplied the motor armature is in one direction when the circuits are closed at contacts 134ª, 134ᵇ and 134ᶜ, thus to cause motor rotation in a direction to raise the electrodes, while the polarity is in reverse direction when the circuits are closed at contacts 135ª, 135ᵇ and 135ᶜ and the motor drive is thus also in reverse direction so as to lower the electrodes. Preferably, suitable manual controls 129ª, 129ᵇ and 129ᶜ are provided, collectively indicated in Figure 12 by the reference character 129 and respectively connected in parallel, as diagrammatically indicated, with the just-described contacts and associated armatures so that the electrode-raising and lowering mechanism may be manually controlled if desired, and any suitable circuit arrangements or switches may be employed to shift the control of the electrode mechanisms 125 from the manual control 129 to the monitor winding control 126, or vice versa.

During operation of the furnace, the latter being a resistance and hence a substantially non-inductive load, the current and hence energy input to the furnace may be maintained constant under the control of the regulating apparatus which is monitored by the current-responsive windings 126ª, 126ᵇ and 126ᶜ. Should the current value increase, the corresponding mechanism raises its electrode to increase the contact or arc resistance factors to a point to restore the current to the desired value whereas a drop in the current flow to the furnace causes lowering of the electrode to diminish the contact or arc resistance factors to a point to restore current flow to the intended value. With a furnace of size and capacity like that above mentioned, the current-responsive controls may be set to maintain substantial constancy of power input at a figure on the order of 4,000 kilowatts, at a voltage on the order of 220 volts, the voltage, of course, varying somewhat as will be understood as a result of the regulating action caused by the constant current monitors 126ª, 126ᵇ and 126ᶜ but on the whole remaining, or being held, substantially constant for a given standard of current constancy as set by the control 120ª, 120ᵇ and 120ᶜ. For convenience, the monitor windings 126ª, 126ᵇ, and 126ᶜ are hereafter referred to as the "monitor winding 126," and the three windings are diagrammatically indicated at 126 in Figure 12 as making up a single unit.

Under these conditions of constant power input thus automatically achieved, the condition of the bottom-lining monolith or ingot 67 is periodically explored by the probe as above described and if it is found that fusion thereof is taking place and that hence the above-mentioned isothermal plane or line 75 is moving downwardly, so as to diminish the thickness of the solid and unfused protective bottom lining, the manual control 120 is set to a somewhat lower value or standard of current constancy to be maintained, thus increasing somewhat the voltage of the output of the low voltage windings of the transformers but on the whole decreasing the power input to the furnace electrodes, the power input being a function of the square of the current. Such resetting of the three controls 120ª, 120ᵇ and 120ᶜ (collectively referred to by the reference "120") is in a direction to increase their respective resistances, causing more of the output of the respective current transformers thereafter to flow through the monitor windings 126ª, 126ᵇ, and 126ᶜ than did prior to the adjustment. That manual operation of resetting the standard of operation of the constant current monitor winding 126 (by setting the control 120) causes the electrode mechanisms 125ª, 125ᵇ and 125ᶜ to raise their respective electrodes to increase the arc resistance relative to the resistance of the melt, cutting the current down to the new standard, and thereafter to maintain constancy of current and power input, but now at a higher standard of electrode elevation and a higher standard of voltage constancy than theretofore. The downward progression of the critical isothermal plane or line is halted, and if the resetting has been made in sufficient magnitude, that plane or line may be made to recede upwardly and thus to restore the thickness of the solidified bottom-lining or even to increase it if desired, as will now be clear.

If the probing indicates that the bottom-lining is being increased in thickness, that is, that the isothermal plane or line 75 is moving upwardly beyond the optimum or desired bottom-lining thickness, the manual controls 120ª, 120ᵇ and 120ᶜ are set in reverse direction, resulting in a reverse operation in that the now lower current flow in windings 126ª, 126ᵇ and 126ᶜ gives them a different standard of operation, bringing the monitor windings into action, by closing the control circuits at contacts 135ª, 135ᵇ and 135ᶜ, to lower the electrodes to a point where the now higher standard of current value and power input are achieved and thereafter maintained, the electrodes now operating at a new but lower standard of elevation than theretofore.

Thus, during operation, the integrity and safety of the bottom-lining ingot 67 may be dependably maintained, and therewith also the integrity and safety of the side lining 74. With constancy of power input during operation, also, substantial variation in radial thickness, as viewed in Figure 6, of the side lining 74 and 74ᵃ is avoided, for material decrease in power input, without more, would have the practical effect of warping or drawing the side of vertical portions of the isothermal lining 74 (Figures 4 and 5) inwardly toward the electrodes, thus building up the lining to greater thickness than is necessary by permitting solidification thereagainst, and hence growth in radial thickness, of alumina, while too great a power input, without attention to other factors, would have in general a reverse effect, bringing about a thinning down of the lateral lining portions, though in all of these connections, other factors are interrelated as later explained.

It is preferably with such controls, either manual or automatic or both, that the earlier abovedescribed formation of the bottom and side lining is effected, as will now be clear, and for any desired period or periods during the formation of the bottom and side linings, the current, voltage, and power input may be automatically maintained constant for such successive intervals of time and at such successive values as are dictated by the progression of fusion as earlier above described.

Operating the furnaces at values on the order of magnitude of those above mentioned, there are constantly brought into coaction other factors, principally the preferably continuous and steady infeed of unfused alumina through the infeed conduits 113—114—115 at a rate on the order of 6,500 pounds per hour; at this rate the unfused material is steadily distributed on top of the existing melt, and if necessary, the operator may, by means of a suitable tool inserted through the peripheral openings 104 (Figure 10) underneath the doors 100, flex or move the inwardly depending portions of these flexible infeed conduits so as to bring more material to different regions as may be desired or as may be indicated by the probing operations. The power input, at constant rate, on the order of 4,000 kilowatts, thus goes to maintain molten the existing melt as against heat losses and particularly as against the protective heat-withdrawing action of the water being run against the external surface of the furnace 10 and to supply the heat energy to convert the in-fed material to molten condition at substantially the rate of its infeed, while maintaining the above-mentioned blanket-like layer of several inches thickness always on the top of the "melt" to oppose heat loss, from the power input and the melt, to the highly heat-conductive un-lined upper wall portions of the side shell 16, thus contributing to the protection of the latter, and to oppose heat loss upwardly into the hood.

When the total melt, under the just-described actions, reaches about 12,000 pounds in quantity, and this may be determined or known from the feed and distribution mechanism 116 (Figure 1) which includes any suitable measuring or continuous weighing mechanism, the upper level of the melt is at or above the orifice-spout 40, and pouring may now be commenced at a suitable rate and in so doing it is not necessary to interrupt the continued feed of unfused material to the furnace or the power input to the electrodes; the furnace is tilted as above described, in clockwise direction as viewed in Figure 1, to bring the orifice 79ᵃ at the inner end of the orifice-spout 40 well below the upper level of the molten or liquid alumina and hence also well below the relatively thick blanket of unfused alumina which overlies, or floats upon, the just-mentioned level or upper surface of the liquid material and thereby risk of contaminating the molten material that flows out of the orifice-spout with unfused or partially fused material is minimized. The electrodes do not tilt and thus maintain, during the actual tilting and after tilting is completed, substantially the same relationship to the melt and the blanket and to continuing inflow from above of unfused material as they did theretofore, the top surface of the melt remaining level or horizontal and the general relationship of having the lower ends of the electrodes terminate in substantially a horizontal plane and hence in a plane parallel to the surface of the furnace contents remaining unchanged.

The electrodes may thus continue to operate as before, the power input continuing under the control of the monitor winding 126, and the water-cooling flow being likewise continued, the upward and inward slope of the front wall 16ᵃ being sufficiently great so that, even during maximum tilt (about 10°), the cooling water continues to run down along it and not off of it before it reaches the lower end of the front wall, and the infeed of unfused or raw material likewise continues preferably at the same rate as before. The front wall 16ᵃ and adjacent portions of the side wall 16ᵇ are protected by the lining portion 74ᵃ which has been built up as above described, preferably with the aid of rocking or tilting of the furnace 10 as was earlier above pointed out; in fact, as above pointed out, the side lining portions 74 and 74ᵃ may be, during the normal operation of the furnace, built up in both radial and vertical directions by the freezing thereagainst of partially fused or fused material, probably intermingled with unfused material from the blanket layer itself, as the level within the furnace rises during the continued infeed of material and fusion, prior to tilt of the furnace.

The extent of tilt is relatively small and thus the relationship between the non-tilting electrodes and the bottom-lining structure which tilts with the furnace, is not greatly disturbed, but since the period of pouring is relatively short, being on the order of ten minutes, disturbance of this relationship during the period of pouring is not great and can be corrected and compensated for upon the return tilt to normal of the furnace structure.

With the above indicated order of magnitude of values, the orifice 79ᵃ has a preferred capacity of about 500 pounds of molten alumina per minute, determined preferably empirically, and with the dimensions of the spout element 40 as above set forth, the orifice 79ᵃ, having a diameter of 2″, gives a controlled rate of flow on the order of 500 pounds of molten alumina per minute, under the conditions of hydraulic head met with during tilt. In this connection, as the level of the liquid alumina is drawn down by the pour, the tilt of the furnace may be progressively increased if desired to further lower the orifice element and thus maintain adequate head to better control the emitted stream and its trajectory.

It is in connection with this operation of pouring that the relationship of front wall 16ᵃ and the relatively thinner lining portion 74ᵃ on the inside thereof, as compared to the portion 74 (see Figures 4, 5 and 6) is made to coact to achieve certain desired actions and results, for, particularly with alumina, especially pure alumina, the fusion or melting and solidifying characteristics present certain difficulties where it is desired to achieve certain crystallizing characteristics in the ingot or ingots to be cast from the furnace. In this connection, let it be assumed that crystalline fused alumina of characteristics more specifically described and claimed in my co-pending application Serial No. 534,654, filed of even date herewith, is to be produced; in such case, I provide, (see Figures 1 and 2), suitable carrier means, such as a train 145 of coupled-together cars 146 carrying a succession of molds 147 open at their tops and aligned on the train of cars without any gap between adjacent lips 147ᵃ of the molds; the train 145 of cars runs on suitable rails 148 which extend parallel to but spaced from the front of the furnace (Figure 2). Each has a capacity of about 300 pounds of alumina, each is made of a suitable material, preferably cast iron, has a wall thickness on the order of 2½", an inside depth on the order of 17", and in horizontal inside dimensions they may be of the same length and breadth, on the order of about 18".

As explained in my just-mentioned co-pending application and for reasons therein stated, it is desired to have certain rates of heat loss from the alumina passed into each mold 147 in order to achieve certain characteristics as therein described in the resultant crystalline structure of the solidified alumina, and I have found that these desired characteristics cannot be achieved excepting with the coaction and functioning of the just-mentioned parts of my furnace structure.

Accordingly, with a train of cars carrying, for example, a succession of eighteen molds 147 positioned on the track 148 with the first mold of the succession in line with the trajectory of the orifice spout, the passage 79 of which is opened or freed for pouring by the withdrawal therefrom of the tapered closure plug 41 (Figure 7) which fits removably into the tapered bore or passage 79 and which is easily dislodged therefrom, the molten alumina discharges into the first mold 147 and when that is filled to within a couple of inches of its top, the train 145 of cars is moved ahead by the distance of the length of a mold, thus to discharge from the orifice spout into the next succeeding mold 147, and this is continued until about one-third of the melt in the furnace has thus been discharged; in quantity that can be, illustratively, about 4,000 pounds, amounting to about eighteen filled molds, whence the furnace is tilted back to normal vertical position.

During the pouring, however, and due to the relationship of the front wall, the lining 74ᵃ, and the orifice-spout element 40, to the melt in the tilted furnace, the molten alumina that enters the orifice 79ᵃ is at a substantial degree of super-heat, coming from a region of the melt that is actually of higher temperature than the normal or average melting point of the material itself, and this relationship is aided by the shift, which is relatively downward and inwardly, of the orifice 79ᵃ itself, relative to the main mass of the melt, as a result of the tilt of the furnace. Thus the molten alumina entering the orifice 79ᵃ may be of a temperature on the order of 2,050° C. or preferably 2100° C., or higher, thus to insure pour at super-heat.

Due to the chord-like relationship of the front wall 16ᵃ to the arcuate wall portion 16ᵇ, the front side lining 74ᵃ is thinner than the other portions 74 thereof, all as above explained, and hence the length of the discharge spout member 40 can be materially diminished, with the result that the super-heated molten alumina loses materially less heat in its passage therethrough than would otherwise be the case, aided by the material thicknesses of the graphite parts 40 and 78 in resisting heat flow therethrough, so that, even accounting for heat loss from the alumina as it passes through the short distance through the air from the discharge end of the spout to the mold 147, it is possible to cause the material to strike and enter the mold at a temperature not less than its fusion temperature and even at a temperature corresponding to some degree of super-heat. It is, therefore, possible to achieve, in the mold 147, an action of cooling or chilling from a heat or temperature level higher than has heretofore been possible in practice, so far as I am aware, and thus to achieve certain unique and different characteristics in crystalline structure in the final product as described and claimed in my said co-pending application.

These features of construction and action are also aided, during the continuity of the pour, by the continued heat energy supplied to the melt as pour continues, thus insuring the maintenance at a higher heat level and hence at super-heat of those portions of the melt from which the orifice 79ᵃ directly receives molten alumina. Another factor, coacting, is the substantial taper in the spout passageway 79 which, coupled with the tilt of the furnace, gives a substantial velocity of flow of molten alumina so that the time interval of possible heat-withdrawing contact thereof with the material of the spout element 40 is correspondingly diminished. These actions also overcome difficulties attendant upon the freezing of molten alumina if pouring or tapping thereof is otherwise attempted.

The train 145 of cars bearing the now-charged molds 147, illustratively eighteen in number, is now moved, by any suitable propulsion means, away from the furnace and by means of a suitable transfer mechanism diagrammatically indicated at 150 in Figure 2, the cars 146 of the train 145 may be shifted to other tracks indicated at 151 where they are allowed to remain, exposed to the atmosphere, for example, for a suitable period, illustratively about 24 hours, to conclude the heat treatment and cooling off of the ingots still in the molds 147, whence by a suitable transfer mechanism diagrammatically indicated at 152, the still loaded but now bearing substantially crystallized and cold alumina ingots, are in suitable sequence returned to the tracks 148, are individually passed onto a dumper, diagrammatically indicated at 153, which dumps both car and its molds as a unit to discharge the mold ingots into a crushing apparatus, diagrammatically indicated at 154, and returns the car with its now empty molds to the track 148 in line with the furnace to make up a new train of suitable length to receive the next pour from the furnace.

With a rate of infeed of unfused material to the furnace on the order of 4,000 pounds per hour, the next pour can be commenced about 40 or 45 minutes following the completion of the preceding pour. An illustrative cycle of operations or mode of operation may comprise continuity of infeed of unfused material at a given rate of X pounds per hour, and commencing pours at just about hourly intervals, each pour lasting long enough to withdraw X pounds of molten material from the furnace. The quantity withdrawn from the furnace can be gauged by the number of molds that are filled on the train or carrier, whence the pour is halted, as by reverse tilt of the furnace, when the desired quantity has been withdrawn. For example, the rate of infeed of unfused material may be a continuous one of 6,000 pounds per hour, accompanied by controlled pourings of 6,000 pounds each, each lasting about ten minutes, with commencement of pourings spaced about one hour apart.

Figure 13:
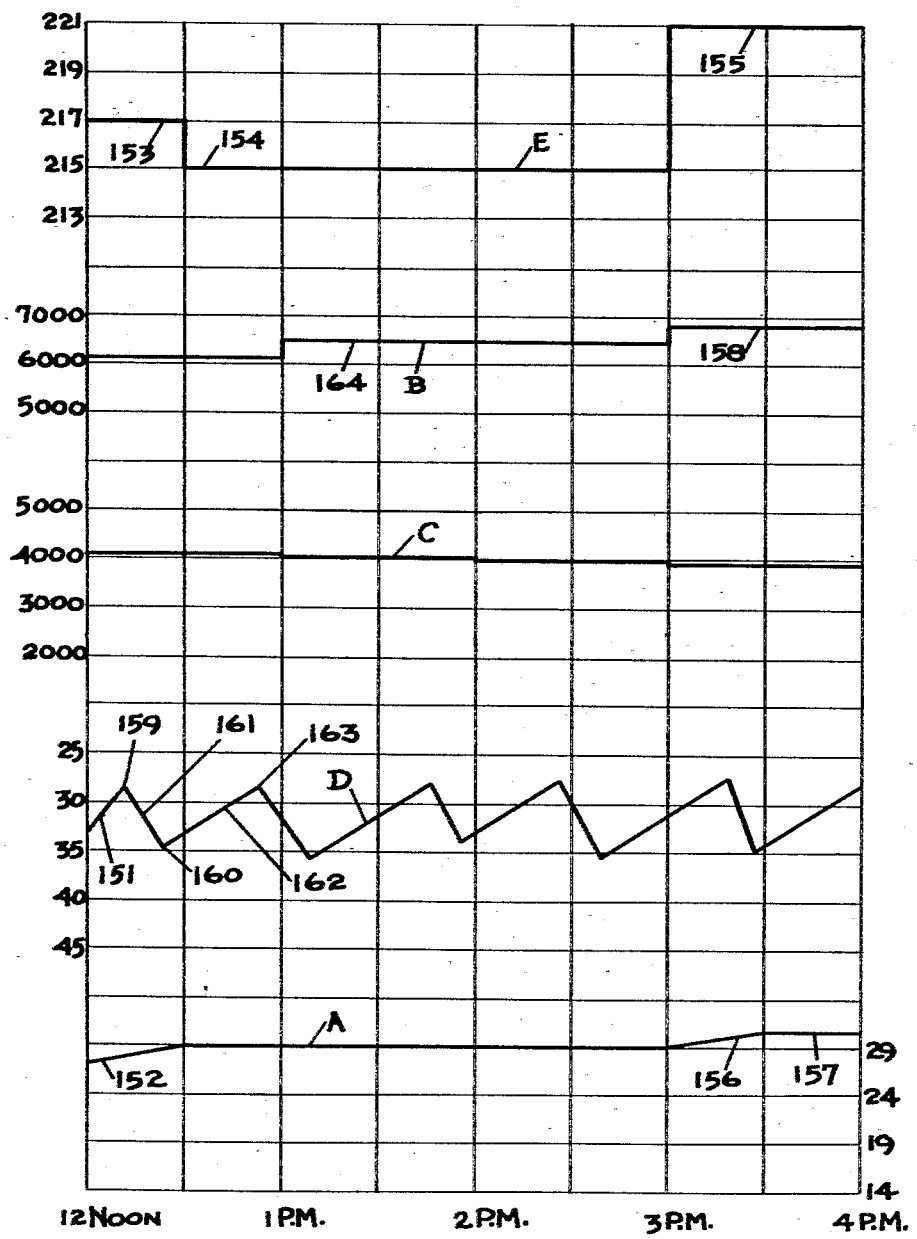
Figure 13 shows, by way of graphs, a number of operating characteristics, over a 4-hour period of continuous operation.

In Figure 13, I have shown on enlarged scale, graphs, based upon actual operation by way of repeated or continuous cycles, such as those just mentioned, in actual operation; these graphs cover only a few hours of operation, but may be said to be typical or illustrative for the capacity and type of material operated upon and dimensional factors as to furnace structure on the order of those above set forth.

Considering the conditions of operation at noon, in Figure 13, the thickness of the bottom-lining ingot 67, determined by probing, was around 27 or 28", as indicated by Graph A, the infeed was at the rate of a little over 6,100 pounds per hour as indicated by the Graph B, power input was at the rate of about 4,050 kilowatts as shown by curve C. Graph D shows the change in level or height, above the furnace bottom-lining 67, of the melt or liquid material in the furnace, determined by the probe, and at noon that level was about 33" down from the top edge of the side shell 16 and the level was rising as indicated by the portion 151 of Graph D, rising at a rate determined by the above-mentioned infeed (Graph B).

The thickness of the bottom lining 67 (Figures 4 and 5), at noon, will thus be seen to be somewhat less than the desired 30", but that thickness was increasing due to the fact that the standard of current constancy to be maintained by the monitor windings 126 had been lowered somewhat, thus to cause the electrodes to operate at a higher standard of elevation; the voltage, as shown at 153 by Graph E, had as a result been raised and was at a higher standard. As a result, there followed an upward progression of the isothermal fusion plane, thus to bring about building up or increase in thickness of the monolith of the bottom lining, and the upwardly sloping portion 152 of Graph A shows the rate of increase or building up by solidification of the bottom lining thickness, having reached about 29" one-half hour after noon at which time the current standard was reset and raised manually, by the control 129 of Figure 12, the voltage falling from about 217 volts (portion 153 of Graph E) to about 215 volts (portion 154 of Graph E). From that time on, with this new standard of current constancy, the voltage remained about the same as did also the power input (Graph C), until 3:00 p. m., and the thickness of the bottom lining (Graph A) continued at just about 29" from 12:30 p. m. to 3:00 p. m.; no material shift in the isothermal fusion plane occurred. At 3:00 p. m. the operator decided to build the thickness of the bottom up, and manually reset and lowered the standard of current constancy, changing the voltage to about 221 volts as shown by portion 155 of Graph E, whence the bottom thickness (Graph A) was increased in thickness as shown by the upwardly sloping portion 156 of Graph A, that portion 156 covering about a one-half hour period, the bottom thickness, from about 3:30 p. m. on, continuing (portion 157 of Graph A) at about 31". Here it will be noted that, though the voltage remains at 221 volts (portion 155 of Graph E), building-up of thickness in the bottom lining ingot practically ceased because the rate of infeed was increased to about 6,800 pounds per hour (portion 158 of Graph B); the power input continues substantially the same, with minor variations, under the control of the monitor regulating apparatus described above in connection with Figure 12.

At about 12:13 p. m., being point 159 on Graph D, the furnace was tilted and pouring into the train of molds was continued until 12:26 p. m., and during that period the liquid level dropped as indicated by the portion 161 of Graph D, eighteen molds or cast iron crucibles 147 having been substantially filled during that interval which amounted to about 13 minutes. At 12:26 p. m. (point 160 in Graph D) the furnace was tilted back, a volume of liquid corresponding to the drop from point 159 to point 160 having been withdrawn, but during that interval infeed continued uninterruptedly (Graph B) as did also the power input (Graph C) so that fusion of in-fed material continued during the tilt and during the pouring off. With each mold charged to about 350 pounds of fused alumina, during the pouring interval of 13 minutes, and with eighteen molds being filled, about 6,300 pounds are withdrawn from the furnace as against a rate of infeed of a little over 6,000 pounds per hour.

With the furnace tilted back to normal vertical position, at point 160 in Graph D and with infeed (Graph B) still continuing, the level of molten or fused alumina continues to rise, as indicated by portion 162 of Graph D, and at 12:55 p. m. (point 163), the furnace is again tilted for a pour of what happens to be again eighteen molds or crucibles. At about 1:00 p. m., the operator decided to increase the rate of infeed, indicated by portion 164 of Graph B to about 6,500 pounds per hour, and it will be noted that at 3:00 p. m. the rate of infeed was again increased to about 6,900 pounds per hour. Since the orifice 79ª of the orifice-spout 40 gives a substantially controlled or fixed rate of pour, those portions of Graph D that slope downwardly to the right have substantially the same angle or slope to the horizontal; the other portions which slant upwardly toward the right, represent rate of infeed of unfused material and their slope is somewhat variable or can be different according to what happens to be the rate of infeed (Graph B), but these variations may be hardly discernible in Graph D.

With the aid of Figure 13, the above-described preferred method of continuously fusing materials like alumina and continuously cooling and crystallizing it in cast form will be better understood, and though the graphs of Figure 13 are based upon automatic control of constancy of power input, as described in connection with Figure 12, and upon coacting manual change in voltage of operation and standard of elevation of the electrodes, it will be seen that all of these controls can be manually monitored, set or adjusted, in accordance with such measurable factors as disclosed by the exploring or probing tool, by the number of ingots cast onto the train of cars, and the rate of infeed of unfused material. During the processing of the bottom-lining 67 and side linings 74, as earlier above described, the controls, adjustments and settings are preferably manually effected though at various successive stages in such processing, such as maintenance of constancy of power input but at a much lower standard than that indicated by Graph C, they may be maintained automatically if desired.

As above pointed out, the bottom-lining 67 (Figures 4 and 5) is preferably of solidified fused alumina throughout; where the furnace operation is to be carried on for the purpose of producing fused pure alumina, such as precipitated alumina, known by the trade-mark "Bayer," similar material is employed in building up the bottom rather than crystalline alumina of other forms or sources which contains impurities, in order thus to avoid contamination of the progressively increased and periodically and partially withdrawn melt. But compositions or materials other than such pure crystalline or "Bayer" alumina can be processed according to my invention and the bottom-lining is preferably made up of the same material that is to be subsequently processed.

However, many of the features of my invention and of the apparatus and controls for effecting maintenance of the bottom and side lining may be effected with a composite bottom lining of which a solid ingot or monolith like the member 67 is a material part, such as shown in Figures 14 and 15, for example. Thus, I may build up such a bottom-lining by using suitable refractory materials of which the uppermost portion, of substantial thickness and which is exposed directly to the melt, comprises a monolith, like the ingot 67 with its integral side lining extensions 74 above described and which preferably is made of the material to be treated in the furnace, such as alumina. I may, for example, proceed as indicated in Figure 15 in which one or more, illustratively one, courses of fire brick 170 are laid, with the aid of a suitable refractory cement, against the inside of the bottom shell 17, then provide over the course 170 of bricks a substantial layer or thickness or bed 171 of a cementitious moldable mix of different sizes of refractory material and a suitable cement such as, for example, lumps and granules of fused alumina, such as commercially known "Alundum," mixed with a suitable alumina cement, such as "Alundum cement." The bricks of course 170 may be 2 or 3" thick, the mortar-like mix making up the bed 171 may be 3 or 4" thick, and before the latter solidifies, there is bedded on top of it a layer 173 of relatively very thick blocks 174 of suitable refractory material, preferably, where the furnace is to process alumina, of graphite. These blocks 174 may be about 10" thick and may be given any suitable individual conformation, including mortice and tenon side edges for interlocking and interfitting, as at 175, and may be otherwise suitably shaped to conform, as indicated in Figure 14, when assembled, to the shape or cross-section of the furnace shell.

On top of the course 173 of graphite blocks 174 and in the space between their outer periphery and the inside of the side shell 16, I now build up, out of graded lumps and grit sizes of fused alumina, a layer much in the manner in which the layer 67 of Figures 4 and 5 was built up before it was fused into an integral solid monolith or ingot, and if desired, it may be built up at and about the sides as was above described in connection with the line 66 of Figures 4 and 5. However, with the structure 170—171—173 (Figure 15) underlying it, it need not be built up to quite the same thickness.

Thereafter, fine grit or powdered alumina is added, graphite starting bars or sticks are put in place, the electrodes are let down adequately, the electrical energy is turned on, and the processing of the superimposed alumina layer or mass proceeded with much in the same manner as was described above in connection with Figures 4, 5 and 6, including the building up of side lining portions against the inside of the side shell 16, utilizing the same controls as there described, excepting that the alumina mass undergoing fusion in the structure of Figure 15 may be safely fused right on down to the graphite course 173, resulting in a solid integral alumina bottom-lining ingot which in Figure 15 is designated by the reference character 67$^a$ since it is essentially similar to the bottom-ingot 67 per se of Figures 4 and 5, with upwardly extending side lining portions of diminishing thickness, indicated at 74$^b$ and 74$^c$, corresponding respectively to the portions 74 and 74$^a$ of Figures 4, 5 and 6. The solid fused alumina portion 67$^a$ of Figure 15 can be of lesser thickness than the bottom-lining 67 of Figures 4 and 5 and in thickness may be on the order of 15 or 20".

In subsequent furnace operations, similar methods of control of the thickness of the bottom element 67$^a$ of Figure 15 are employed as are above described in connection with the unitary alumina bottom-ingot 67 of Figures 4, 5 and 6.

The construction and functioning of my method, apparatus and system will now be clear, and by way of them I have been able to produce continuously crystalline alumina having certain desirable and unique features of composition and structure which give the alumina, when broken down into grain form from the solidified ingots that are dumped out of the molds 147, characteristics of utility for abrasive purposes and that give the ingots themselves a number of desirable properties and characteristics, all of which are more specifically described and are also claimed in my aforesaid co-pending application, but many features of my process, apparatus and system are adaptable for treatment of other refractory oxides and for the treatment of alumina of composition other than the above-mentioned Bayer alumina.

As described in my above-mentioned application, powdered Bayer alumina, illustratively set forth above as the starting material, is substantially free of such usual alumina ore impurities as iron, silica, zirconia, titania, etc., and as available on the market its alumina ($Al_2O_3$) content is usually and illustratively at least 98% by weight, the remainder being made up by moisture, water or other impurities and includes a sodium compound, usually referred to as "soda" which is present, calculated as $Na_2O$, in an amount usually between 0.2% and 1.0% by weight. This sodium compound is present as a result of production of the high purity alumina by the Bayer process in which bauxite is treated with sodium hydrate, practically pure alumina being precipitated from the solution, but in recovering the precipitate, the latter is accompanied by a sodium compound of the above-mentioned character and usually in the above-mentioned amount.

Bayer alumina, therefore, forms a convenient starting material for the specific purposes set out in my above-mentioned application, but it is to be understood that the above-mentioned sodium compound may be increased in the starting material by the addition thereto and thorough intermixing therewith, preferably in powder form, of suitable sodium-containing substances, preferably oxygen-bearing, such as sodium hydroxide, sodium carbonate and the like where it is desired to increase the initial soda content of the starting material. Or I may use substantially pure alumina to which is added the desired amount of sodium compound where the specific form of alumina ingot of my above application is desired to be produced. And, moreover, any equivalent of the above-mentioned sodium compounds may be employed for the above-mentioned specific purposes, such as any oxygen-bearing compound of an alkali metal, and these are comprehended within such terms as "soda" or "sodium compound."

When treated in a furnace as above described and poured at substantial super-heat into the molds, the substantial trajectory of pour coupled with the super-heated condition of the molten alumina achieves a boiling off or dissipation, in whole or in part, of certain impurities such as those earlier above mentioned and some of the sodium compound impurity. Some of the latter is desirable, as explained in my said application, for inclusion in the charge of each mold, being uniformly distributed throughout the molten alumina both in the furnace and in the mold. When the starting material contains a higher percentage of sodium compound, the super-heat desirably boils off some of the sodium oxide impurity, thus to keep the amount that goes into the mold charge from being excessive. In my said application, it is preferably present in the final ingot in an amount, calculated as $Na_2O$, of from 0.3% to 0.5%.

Other controls may also be effected. For example, by controlling the thickness of the blanket of continuously in-fed powdered starting material that floats, as above mentioned, on top of the melt, losses of soda content by boiling off during continued fusion in the melt in the furnace may be substantially correspondingly varied. The greater the thickness of blanket, the less soda content boils off; with a furnace of a capacity like that earlier above described, the thickness of the blanket of unfused material may vary from about 1″ to 12″. Thus, for example, with Bayer alumina as a starting material averaging about 0.61%, by weight, of sodium compound, calculated as $Na_2O$, and thus closely approximating a desired percentage of soda content in the final ingot, a lesser amount of soda content need be boiled off and I have achieved satisfactory results, in the form of a final ingot whose soda content is about 0.54%, by operating the furnace with a relatively thick layer or blanket of unfused material on the order of about 12″; in that way, considering the boiling off that takes place in the pour stream, I am able to keep the boiling off in the furnace down to the desired rate. The figures just given are illustrative of a run of the above-described furnace, with pours of about twelve minutes, each commenced at about hourly intervals.

If the starting material has a higher soda content, the thickness of the blanket is reduced, thereby to lessen the inhibition by the blanket of boiling off of the soda content in vapor phase and thereby make certain that enough of it is boiled off. I may also increase the amount of soda content thus boiled off in the furnace, by increasing the increment of time that any increment of molten material undergoes "boiling" in the furnace; for example, I may lengthen the intervals between successive pouring operations, with or without lessening the rate of in-feed of unfused material, with or without lessening the rate of pour during pouring operations (as by change of orifice size in the orifice spout), or both.

I prefer to employ electrodes, such as three in number, for polyphase operation, such as 3-phase, for I have discovered that electro-magnetic reactions upon the current-carrying portions of the melt, if materially present, are not violent in that no violent or disruptive circulatory movements of molten alumina appear to take place, giving the actual process and fusion a quiescence that appears to aid in maintaining, in the molten alumina, substantially the same uniform distribution of the fine increments of sodium compound as is present in the in-fed material. It also contributes toward achieving the substantial super-heat above mentioned and increases the safety factor of the furnace. Moreover, it contributes toward making it possible to operate, where necessary, with a relatively thin blanket or layer of unfused alumina, the absence of substantial turbulence caused by circulatory movements in the melt having the effect of lesser tendency to disrupt the blanket.

The molten alumina, in striking the cast iron mold, forms a skin or layer of crystallized alumina adjacent to and in contact with the inside surface of the mold; this formation is substantially instantaneous, aided by the super-heated condition of the alumina, the temperature of the iron mold being exceedingly lower than that of the molten alumina. This skin or layer acts as a heat insulator to protect the cast iron of the mold and also to protect the contents of the mold from becoming interiorly contaminated by or with iron from the mold or any reaction product. Measurements have shown the temperature rise that takes place in the cast iron mold to be from about room temperature to about 600° C. after about one hour, whence the temperature falls off gradually, both mold and ingot losing heat to the atmosphere, the mold doing so by way of all of its external wall faces including the bottom, the carrier cars on which the molds rest being an open framework so as to expose all sides and the bottom as well. The alumina ingot in the mold remains substantially molten at its center for a period of about one hour.

It is found that these unexpected actions are material to achieving a low rate of internal cooling which, in turn, aids the production of unexpectedly large alumina crystals, the integrated cooling time of the ingot being really quite extensive, and unexpectedly so. High purity alumina crystals as large as grit size 14 are produced and on the average crystal sizes appropriate to prepare commercial grain grit sizes from about 24 to 100 can be produced, it being noted that the ingot fractures or breaks up easily, as is later explained, its large crystals being crushed in suitable crushing operations to give grain sizes such as those just mentioned in which individual grains are individual crystals or are fragments of individual crystals, and not aggregates of smaller crystals.

The production of large crystal structures in the ingot is contrary to prior prognostications according to which always fine or small sizes of crystals are to be produced.

The super-heated condition of the pour into the mold, I believe, makes for the quicker formation initially of the above-mentioned skin or layer of insulating crystalline alumina that solidifies against the inside mold faces, thereafter slowing up heat loss, yet solidification takes places inwardly toward the center of the ingot relatively rapidly, being completed in from one to two hours; as a result, volatile matters, such as gases or vapors that accompany the sodium oxide, probably are maintained volatile longer but because of the rapid progression of solidification or crystallization, these volatile matters have very little opportunity to collect or coalesce to form large bubbles or enclosed spaces and are constrained in an inward direction toward the center at a relatively rapid rate and thereby are made to form elongated capillary-like pores whose axes extend generally in directions toward the center of the ingot, as is discernible upon inspection of a fractured ingot, these capillary pores, being macropores, being substantially uniformly distributed throughout the ingot.

However, they extend between or amongst alumina crystals and crystal structures of practically pure alumina and the crystals of the latter are found to have uniformly distributed through them very minute and numerous generally spherical pores discernible under the microscope and hence are referred to as micropores; the latter are produced primarily by the sodium compound which, in minute quantities, is uniformly distributed throughout the molten alumina, the rapidity of crystallization apparently preventing escape from the individual embryo-crystal masses of all of the vapors or gases and hence many of these individual entities are entrapped within the embryo-crystal to form these micropores. Such of it as escapes takes part, with other entities of sodium compound, to form the above-mentioned elongated capillary-like macropores.

By somewhat increasing the sodium compound content, as by lessening the amount of superheat, the number and sizes of the micropores may be somewhat increased and the size of the macropores may also be increased.

In the crystals, the microporosity may be on the order of 15%. I can achieve a certain desirable control in what happens to beta alumina; this material may be said to be a sodium aluminate of the formula $Na_2O.12Al_2O_3$; generally it is an objectionable material in that it is not hard, is not an abrasive and is unstable. In certain prior processes, as when fused alumina is produced in an electric furnace of the Higgins type (see Patent No. 775,654 to A. C. Higgins of November 22, 1904), the beta alumina crystallizes in non-uniform distribution throughout the large massive pig into which the furnace contents solidify, usually appearing in large quantity in a separate zone, usually the central top portion of the pig from which the beta crystals or beta alumina has to be laboriously separated out; it is usually thrown away and with it goes some alpha alumina, thus representing a waste.

In my method of producing fused alumina, no large beta alumina crystals are formed and there is no non-uniform distribution nor any concentration thereof in any particular part of the ingot. The actions above described in practicing my process insure such a uniform distribution of the sodium compound in such minute particles throughout the entire ingot that, in the final product, beta alumina is principally sub-microscopic, being distributed in very fine particles throughout the mass of the ingot, but not within the individual alumina crystals; it is found distributed in these fine particles within and throughout the above-mentioned macropores and in the dividing lines or planes between the alumina crystals themselves. If, in these fine particles, the beta alumina is in crystal form, as it probably is, the crystals are nevertheless and also of small sizes corresponding to these sub-microscopic or very fine particles.

This is of great advantage when the ingot is broken down into grain sizes for abrasive purposes, for the resultant grains are whole alumina crystals or fragments thereof, devoid of internal beta alumina, yet of high microporosity, and the above-mentioned fine particles of beta alumina, which in the ingot adhere to the walls of alumina crystals either in the macropores or in the dividing planes between crystals, are abraded off the crystal walls from which they easily are detached in the course of fragmentation and handling of the fragments and ultimate grains. Hence no segregation from various zones of a large pig as in the Higgins patent furnace process, with accompanying wastage has to be resorted to and grain structures of uniform purity are achieved from the entire ingot, with no wastage and moreover without detrimental contamination by the beta alumina of the internal crystal structure of the crystalline alumina. Thus uniform and efficient and in fact complete utilization of the ingots is possible, and abrasive grain is achieved that has different characteristics from that heretofore produced.

The just-described product made from the above-described illustrative Bayer alumina as a starting material is set forth in greater detail in my co-pending application and, together with certain principal features of the process and of the mold for producing it are claimed in the said application and, for purposes of the present application, is set forth as illustrative and not by way of limitation unless so limited in the claims herein.

In connection with the earlier above-described method of operation of the furnace, it will be understood that, for a number of practical reasons of greater convenience, greater safety and to allow more time, at the above-described illustrative rate of production, for the handling of the molds and mold carrier cars, the rate of pour of molten alumina, covering a continuous period of pour of about ten or twelve minutes, is greater than the rate of infeed of starting material, thus to give a time interval of around forty-five minutes during which pour is discontinued and infeed of starting material and of electrical energy is continued as it was during the period of pour; this mode of procedure and the time intervals and quantities mentioned are therefore also illustratively set forth and not by way of limitation unless so limited in the claims, for it will be appreciated and understood, in view of all of the foregoing, that the ratio of time period of pour to time period of no pour may be widely varied and that uninterrupted pour may be achieved, if desired.

For example, the rate of pour may be made less, as by utilizing an orifice spout of smaller flow capacity in which case, with the same rate of infeed of starting material, the time period of pour is made longer. Thus any desired practicable ratio of rate of infeed to rate of pour may be adopted and these two rates may even be made equal, in which case the furnace remains tilted for pour all the time and the Graph D of Figure 13 would be substantially a straight line. Of course, appropriate adjustment of the rate of power input is to be made as will now be appreciated and understood, appropriately proportioned to the change desired; thus, with equality of rate of infeed of starting material and rate of pour, the power input is materially increased and hence the electrodes are operated at a higher level of conversion of electrical energy into heat energy, and in such case it is desirable to maintain a materially lesser quantity of melt in the furnace since the conversion of the refractory oxide to fused condition has to take place at a higher standard of intensity.

It will thus be seen that there has been provided in this invention a method and apparatus in which the objects hereinbefore noted together with many thoroughly practical advantages are successfully achieved. It will be seen that the apparatus is of a thoroughly practical character and that the method is capable of being dependably and efficiently carried on in practice.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. A furnace for fusing a refractory material that is substantially non-conductive electrically comprising a metal furnace shell externally water-cooled having a bottom lining comprising a monolith of substantially similar, fusible, and electrically substantially non-conductive refractory material and having a hood structure substantially closing over the top of the furnace shell, electrodes projecting through the hood and operating at their lower ends to convert electrical energy to heat energy for fusing the fusible refractory material fed to the furnace to form a melt of in-fed refractory material with the melt directly supported by said bottom lining, means for feeding the refractory material into the furnace and operable at a time-rate substantially commensurate with the rate of fusion effected by said electrodes and to maintain a heat-insulating blanket of unfused in-fed refractory material covering the melt in the furnace, said blanket co-acting to oppose material transition of the isothermal fusion plane upwardly from the upper surface of the monolithic bottom lining, and means for withdrawing molten refractory material from the furnace at a time-rate so related to the time-rate of feed of refractory material as to prevent diminishing the quantity of melt in the furnace at any time below that quantity sufficient to achieve continuity of fusion of in-fed material without disrupting the heat-insulating blanket layer and without materially invading the bottom lining by fusion thereof, whereby the thickness of the monolithic refractory bottom lining is not materially increased by solidification of part of the melt as would occur upon upward transition of said isothermal plane and is not materially diminished by fusion as would occur upon downward transition of said isothermal plane.

2. A furnace as claimed in claim 1, in which the furnace shell is provided with an orifice spout which, by its orifice action, substantially determines the rate of withdrawal of fused refractory material from the melt.

3. A furnace as claimed in claim 1, provided with automatic means for regulating the power input to said electrodes, said regulating means having means for setting its standard of operation to regulate the power input at a value to maintain the melt at or above the temperature of fusion and to supply heat energy at a rate commensurate with the time-rate of in-feed of refractory material while maintaining a layer, of substantial thickness, of unfused in-fed material covering the melt, thereby to maintain said blanket.

4. A furnace as claimed in claim 1, provided also with means for controlling the positions of the electrodes relative to the melt and to the monolithic bottom lining of refractory material to coact to maintain the isothermal fusion plane against material downward transition into the monolithic bottom lining and against material upward transition thereof away from the monolithic bottom lining.

5. A furnace as claimed in claim 1, having means mounting said electrodes for movement in directions toward or away from the bottom lining, means responsive to current flow to the electrodes for controlling said electrode-moving means and thereby maintain substantial constancy of current input to the electrodes, and means for changing the standard of operation of said electrode-moving means and thereby alter internal thermal relationships so as to raise or lower the isothermal fusion plane in relation to the inner boundary of said lining and thereby control the thickness of said lining.

6. A furnace as claimed in claim 1, in which said hood structure comprises side portions built up in a general upward direction and substantially aligned with the furnace shell and having aperture means therein whereby a probe may be inserted laterally into the furnace to probe the condition and thickness of the monolithic portion of said bottom lining.

7. A furnace for fusing a refractory material that is substantially non-conductive electrically comprising a metal furnace shell having a bottom lining comprising a monolith of refractory material of substantially the same chemical composition as the refractory material to be fused in the furnace, electrodes projecting into said furnace shell for fusing fusible material, said electrodes having controllable means mounting them for movement in directions toward or away from the monolith of the furnace bottom, said metal furnace shell comprising a substantially frusto-conical side shell with a bottom shell that is substantially a segment of a sphere and thereby approximates internally a shape conforming to an isothermal plane which bounds said bottom lining and which under normal operating conditions is maintained at a temperature below the fusion point of the refractory material of the monolith by external water-cooling of said shell and by controlling the position of the electrodes and the energy supplied thereto to achieve a temperature gradient through the bottom lining including said monolith of refractory material on the order of from the fusion temperature of the said material to several hundred degrees C., whereby to maintain substantial constancy of thickness of said monolith throughout the continued operation of the furnace.

8. A furnace as claimed in claim 7, in which the water-cooling is effected by conduit means including conduit means extending about the upper end of the side shell to emit water thereagainst at a rate to substantially envelop the furnace shell with a downwardly moving sheet of water, said side shell having therein a spout for withdrawing fused refractory material from the melt, and shield means sealed to an outwardly projecting portion of the spout and spaced from the external face of the side shell to guard against water spillage from the side shell to the pour stream.

9. A furnace for fusing refractory material comprising a metal furnace shell comprising a side shell closed by a bottom shell and having means for externally water-cooling it and having electrodes projecting downwardly into the side shell and toward the bottom shell, said shell having a monolithic bottom lining of refractory material of substantially the same chemical composition as the refractory material to be fused in the furnace, said bottom lining being formed in situ by progressive pre-fusing under the action of said electrodes of a sufficient amount of said material to form, when cooled, a substantially solid monolithic ingot of a thickness to withstand, without fusion, a temperature gradient from the temperature of fusion of the material to a temperature on the order of several hundred degrees C. at the water-cooled furnace shell, means supporting said electrodes independently of said furnace shell, and means supporting said furnace shell for tilting back and forth, the inside surface of said monolithic ingot forming the bottom lining being upwardly concave for receiving and retaining refractory material subsequently fed to the furnace and converted to fused condition under the action of the conversion of electrical energy to heat energy at the lower ends of said electrode, said surface being influenced into such concavity by rocking tilting movement of the furnace shell relative to the electrodes during the aforesaid progressive formation of the monolithic bottom lining.

10. A furnace for fusing refractory material comprising a unitary metal furnace shell having bottom and sides and externally water-cooled and having electrodes projecting downwardly into the shell and in directions generally toward the shell bottom, said shell having a bottom lining comprising a monolith of pre-fused refractory material of substantial thickness and of substantially the same chemical composition as the refractory material to be fused in the furnace, said monolith of said bottom lining being formed in situ by progressive pre-fusing of a sufficient amount of said material to form, when cooled, a substantially solid ingot of a thickness to withstand, without fusion, a temperature gradient from the temperature of fusion of the material to a temperature on the order of several hundred degrees C. at the water-cooled furnace shell, means mounting said electrodes for movement in directions toward or away from said bottom lining, and means for controlling the energy input to said electrodes and for controlling the positions of the electrodes during subsequent fusion of refractory material added to the furnace so as to maintain said bottom monolithic lining of substantially constant thickness.

11. A furnace for fusing refractory material that is electrically substantially non-conductive when in solid or unfused condition comprising a metal furnace shell externally water-cooled and having electrodes projecting downwardly into the shell toward the bottom thereof and adapted to convert electrical energy to heat energy by arcing effects between the lower end portions of the electrodes, said shell having a bottom lining in the form of a solid electrically non-conductive monolith of refractory material of substantially the same chemical composition as the refractory material to be fused in the furnace, said bottom lining being formed in situ by progressive pre-fusing of a sufficient amount of said material to form, when cooled, a substantially solid electrically insulating monolith of a thickness to withstand, without fusion, a temperature gradient from the temperature of fusion of the material to a temperature on the order of several hundred degrees C. at the water-cooled furnace shell, there being interposed between the metal shell and outer portions of the bottom monolithic lining fragmented or granular refractory material to provide leeway for relative shifts between the monolithic lining and the metal shell under changes of temperature.

12. A furnace for fusing refractory material that is electrically substantially non-conductive when in solid or unfused condition comprising a metal furnace shell externally water-cooled and having electrodes projecting downwardly into the shell toward the bottom thereof and adapted to convert electrical energy to heat energy by arcing effects between the lower end portions of the electrodes, said shell having a bottom lining in the form of a solid electrically non-conductive monolith of refractory material of substantially the same chemical composition as the refractory material to be fused in the furnace, said bottom lining being formed in situ by progressive pre-fusing of a sufficient amount of said material to form, when cooled, a substantially solid electrically insulating monolith of a thickness to withstand, without fusion, a temperature gradient from the temperature of fusion of the material to a temperature on the order of several hundred degrees C. at the water-cooled furnace shell, the outer portions of said monolithic lining having interposed between them and the wall of the shell one or more layers of built-up blocks of a different refractory material precluded from contaminating the subsequent melt in the furnace by the refractory material of the monolith per se, and electrically insulated from the region of arcing at the electrodes by said electrically non-conductive monolith.

13. A furnace for fusing alumina comprising a metal furnace shell having electrodes projecting downwardly into the shell and having a bottom lining comprising a monolith of solidified fused alumina for directly supporting the melt of alumina, said monolith having an upwardly concave surface substantially coinciding with the upwardly curved isothermal fusion plane created by the electrodes in the molten alumina supported by the monolith, means for controlling the positions of said electrodes relative to said concave surface and for controlling the electrical energy input thereto to maintain substantial coincidence, during operation of the furnace, of said isothermal fusion plane and said concave surface and thereby substantially prevent accretion or diminution of said monolith of solidified alumina, a discharge spout leading from the exterior of said shell to said concave surface in said monolith for withdrawing molten alumina therefrom, means mounting said furnace shell for tilting relative to the electrodes for purposes of pour of molten alumina through said spout and about an axis to maintain substantial coincidence between said upwardly curved lining surface and said isothermal fusion plane during tilting and thereby substantially prevent accretion or diminution of said monolith of alumina during the changed relationship between the electrodes and the furnace shell caused by said tilting.

14. A furnace for fusing refractory material comprising a metal furnace shell having electrodes projecting downwardly into the shell and having a bottom lining of refractory material for directly supporting the melt of refractory material, said bottom lining having an upwardly concave surface substantially coinciding with the upwardly curved isothermal fusion plane created by the electrodes in the molten refractory material supported by the lining, means mounting said furnace shell for tilting relative to the electrodes and about an axis to maintain substantial coincidence between said upwardly curved lining surface and said isothermal fusion plane, said bottom lining, due to its upwardly curved surface, having upward extensions forming side linings for said furnace shell, that side lining portion that approaches the region of said electrodes during tilt out of normal position of the furnace shell being of greater thickness than the portion opposite thereto, and a discharge spout in said furnace shell and extending into said last-mentioned lining portion.

15. A furnace for fusing alumina comprising a metal furnace shell having electrodes projecting downwardly into the shell and having a bottom lining comprising a monolith of solidified fused alumina for directly supporting the melt of alumina, said monolith having an upwardly concave surface substantially coinciding with the upwardly curved isothermal fusion plane created by the electrodes in the molten alumina supported by the monolith, means for controlling the positions of said electrodes relative to said concave surface and for controlling the electrical energy input thereto to maintain substantial coincidence, during operation of the furnace, of said isothermal fusion plane and said concave surface and thereby substantially prevent accretion or diminution of said monolith of solidified alumina, a discharge spout leading from the exterior of said shell to said concave surface in said monolith for withdrawing molten alumina therefrom, means mounting said furnace shell for tilting relative to the electrodes for purposes of pour of molten alumina through said spout and about an axis to maintain substantial coincidence between said upwardly curved lining surface and said isothermal fusion plane to prevent substantial accretion or diminution of said monolith of alumina during the changed relationship between said electrodes and said shell during said tilting, said monolith of alumina, due to its upwardly curved surface, having upward extensions forming side linings of solid alumina for said furnace shell, said discharge spout extending inwardly from said shell through said upward extensions and extending outwardly beyond said metal shell and through an opening therein, said discharge spout being held against material shift by possible accretions or diminutions of said solid alumina upward extensions by means of a tubular metal sleeve secured in said side wall of the shell and at said opening therein, said sleeve projecting outwardly away from said shell and enveloping said outwardly extending portion of the discharge spout.

16. A furnace for fusing refractory material comprising a metal furnace shell having electrodes projecting downwardly into the shell for converting electrical energy into heat energy by arcing effects between their lower end portions and having a bottom lining comprising a monolith of pre-fused and solidified fusible refractory material for directly supporting the melt of refractory material supplied to the furnace and acted upon by the heat energy produced by said electrodes, said monolith having an upwardly concave surface substantially coinciding with the upwardly curved isothermal fusion plane created by the electrodes in the molten refractory material supported by the refractory monolith, means for passing a heat-abstracting medium into thermal relation to the external surface of said shell to withdraw heat therefrom and to coact in protecting said refractory monolith against material fusion and resultant diminution as would be caused by invasion by said isothermal fusion plane of said refractory monolith, means for controlling the energy input to said electrodes to coact in controlling the position of said isothermal fusion plane to substantially maintain its coincidence with said concave surface of said refractory monolith and thereby substantially prevent material accretion or diminution of said monolith, and means for controlling the rate of heat withdrawal effected by said heat-abstracting medium.

17. A furnace for fusing refractory material comprising a metal furnace shell having electrodes projecting downwardly into the shell for converting electrical energy into heat energy by arcing effects between their lower end portions and having a bottom lining comprising a monolith of pre-fused and solidified fusible refractory material for directly supporting the melt of refractory material supplied to the furnace and acted upon by the heat energy produced by said electrodes, said monolith having an upwardly concave surface substantially coinciding with the upwardly curved isothermal fusion plane created by the electrodes in the molten refractory material supported by the refractory monolith, means for passing a heat-abstracting medium into thermal relation to the external surface of said shell to withdraw heat therefrom and to coact in protecting said refractory monolith against material fusion and resultant diminution as would be caused by invasion by said isothermal fusion plane of said refractory monolith, means for supplying unfused refractory material to the top of the melt, said supplying means being controllable to permit maintenance of a heat insulating blanket of unfused material on top of the melt and thereby coact to prevent material upward transition of said isothermal fusion plane and resultant accretion of said refractory monolith and means for withdrawing molten refractory material from the melt at a point below the top level thereof.

18. A furnace for fusing refractory material comprising a metal furnace shell having electrodes projecting downwardly into the shell and having a bottom lining of refractory material for directly supporting the melt of refractory material, said furnace shell comprising a bottom shell and a side shell whose walls slope upwardly and inwardly, means for supplying water externally to upper portions of said sloping side walls and controllable to effect substantial envelopment of the side shell with a downwardly moving sheet of water, a discharge spout of refractory material extending through a side wall, means comprising a metal sleeve-like member enveloping said discharge spout externally of the side shell and in sealed connection therewith for sealing the refractory discharge spout against access thereto of water, said metal sleeve-like member having, in sealed connection therewith at an outer end portion thereof, sheet means forming a physical barrier against access of water from the side shell to the discharge end of said spout means.

19. A furnace for fusing refractory material comprising a metal furnace shell having lining means comprising a monolith of fusible refractory material that is electrically substantially non-conductive at temperatures below its fusion point and having a hood structure substantially closing over the top of the shell, electrodes projecting into the interior of the furnace shell and toward said monolithic fusible refractory material and adapted by arcing effects at their lower end portions to convert electrical energy into heat energy for heating material fed to the furnace, means for passing a heat-abstracting medium into thermal relation with and externally of said shell for withdrawing heat therefrom to coact to oppose diminution of said monolithic lining means by fusion thereof, means for supplying unfused material to the interior of the furnace to form a melt supported by said monolithic fusible lining means and to maintain a heat-insulating blanket of unfused in-fed material substantially covering the melt to coact to oppose accretion of said monolithic lining means, said hood structure having aperture means therein, conduit means connected to said hood structure, and suction means connected to said conduit to draw air through said aperture means and into the hood structure and above said heat-insulating blanket and thereby to coact in opposing temperature rise of said heat-insulating blanket.

20. A furnace for fusing refractory material comprising a metal furnace shell having electrodes projecting downwardly into the shell and adapted by arcing effects between their lower end portions to convert electrical energy into heat energy and having bottom lining means comprising a monolith of refractory material for directly supporting the melt of fusible refractory material that is electrically substantially non-conducting when below its fusion point, said monolith having an upwardly concave surface substantially coinciding with the upwardly curved isothermal fusion plane created by the electrodes in the molten refractory material supported by the lining, a hood structure covering over the top of said shell, and control means including means for controlling the energy input to said electrodes and the physical position of the latter relative to said monolithic fusible lining for opposing material accretion or diminution of said monolithic lining, said hood structure being provided with opening means through which to insert a probe or the like for probing the altitude of said concave surface to determine the presence or absence of effects of accretion or diminution to thereby determine the direction in which to actuate said control means.

21. The steps in a method of fusing a refractory material which comprise supplying unfused refractory material to a furnace having electrodes projecting thereinto to convert electrical energy to heat energy by arcing effects between their lower end portions and having refractory bottom lining means comprising a monolith of solidified fusible refractory material that is electrically substantially non-conductive when below its fusion point and that is of substantially the same chemical composition as the refractory material to be fused, with said monolith having an upwardly concave surface substantially coinciding with the upwardly curved isothermal fusion plane created by the electrodes in the melt of refractory material produced by said heat energy and supported by the monolith and maintaining said monolith intact and against material accretion or diminution by withdrawing heat therefrom externally through the furnace wall and regulating the positions of the electrodes and the energy input thereto to maintain substantial coincidence of said concave lining surface and said isothermal fusion plane.

22. The steps in a method of fusing a refractory material which comprise building up within a metal furnace shell having electrodes projecting downwardly thereinto a bottom lining structure of unfused refractory material in fragmented form and which is electrically substantially non-conducting when below its fusion point and which has substantially the same chemical composition as the refractory material to be fused in the furnace, effecting progressive fusion of the fragmented material of the lining structure in directions toward the metal shell by regulating the positions of the electrodes and the energy input thereto, halting the progression of the fusion of said structure at a point falling short of the metal shell, thereby to leave unfused material in contact with the shell, allowing the fused portion of the lining structure to solidify and thereby form a solid and monolithic ingot-like lining that is electrically non-conducting, charging the furnace with refractory material to be fused under the heat effects produced by said electrodes, and thereafter regulating the positions of the electrodes and the energy input thereto to maintain substantial coincidence between the surface of the monolithic ingot-like lining and the isothermal fusion plane created in the melt by the electrodes, and thereby oppose diminution of said monolithic lining as would occur by fusion thereof and to oppose accretion thereof as would occur by movement of said isothermal fused plane upwardly away from the surface of said monolithic lining.

23. A method as claimed in claim 22 comprising also the steps of rocking the furnace shell relative to the electrodes during progressive fusion of said built-up lining structure to thereby accentuate lateral progression of fusion and to improve concavity of shape of the upper surface of the ingot-like lining.

24. A furnace as claimed in claim 1 in which the means for withdrawing molten refractory material from the furnace comprises means for withdrawing molten material at substantially periodic time intervals which are commenced at a time not later than that at which the mass of the melt is so large as to risk accretion of said monolithic bottom lining by the solidification thereon of material of the melt and which is halted at a point prior to that at which the remaining mass of the melt is small enough to risk diminution of the monolithic bottom lining by fusion of upper portions thereof, together with means for regulating the power input to said electrodes at a rate to maintain the melt, both during intervals of withdrawal of molten refractory material and during the intervening intervals, at or above the temperature of fusion.

25. A furnace for fusing refractory material comprising a metal furnace shell of generally circular cross-section having three electrodes projecting downwardly into the shell and arranged at the apexes of a substantially equilateral triangle whose center is substantially at the vertical axis of said shell and said shell having a bottom lining of refractory material for directly supporting the melt of refractory material, said bottom lining having an upwardly concave surface substantially coinciding with the upwardly curved isothermal fusion plane created by the electrodes in the molten refractory material supported by the lining, means mounting said furnace shell for tilting relative to the electrodes and about an effective axis substantially parallel to a side of said triangle and at least approximately to maintain substantial coincidence between said upwardly curved lining surface and said isothermal fusion plane, said bottom lining, due to its upwardly curved surface, having upward extensions forming side linings for said furnace shell, said shell having a substantially flattened side wall portion parallel to and adjacent said side of said triangle and approximating a chord of its otherwise circular cross-section whereby that side lining portion that approaches the region of said electrodes during tilt out of normal position of the furnace shell is of greater thickness than the lining portion opposite thereto which lines said flattened side wall portion of the shell, and a discharge spout in said furnace shell and extending through said flattened side wall portion of the shell and into said last-mentioned lining portion.

26. A furnace for fusing refractory material comprising a metal furnace shell having electrodes projecting downwardly into the shell for converting electrical energy into heat energy by arcing effects between their lower end portions and having a bottom lining comprising a monolith of prefused and solidified fusible refractory material for directly supporting the melt of refractory material supplied to the furnace and acted upon by the heat energy produced by said electrodes, said monolith having an upwardly concave surface substantially coinciding with the upwardly curved isothermal fusion plane created by the electrodes in the molten refractory material supported by the refractory monolith, means for passing a heat-abstracting medium into thermal relation to the external surface of said shell to withdraw heat therefrom and to coact in protecting said refractory monolith against material fusion and resultant diminution as would be caused by invasion by said isothermal fusion plane of said refractory monolith, means for withdrawing molten material at substantially periodic time intervals which are commenced at a time not later than that at which the mass of the melt is so large as to risk accretion of said monolith by the solidification thereon of material of the melt and which are halted at a point prior to that at which the remaining mass of the melt is small enough to risk diminution of the refractory monolith by fusion of upper portions thereof, and means for regulating the power input to said electrodes at a rate to maintain the melt, both during intervals of withdrawal of molten refractory material and during the intervening intervals, at or above the temperature of fusion and to coact to maintain substantial coincidence of said isothermal fusion plane and said concave surface of said refractory monolith.

27. A furnace for fusing refractory material comprising a metal furnace shell having electrodes projecting downwardly into the shell for converting electrical energy into heat energy by arcing effects between their lower end portions and having a bottom lining comprising a monolith of prefused and solidified fusible refractory material for directly supporting the melt of refractory material supplied to the furnace and acted upon by the heat energy produced by said electrodes, said monolith having an upwardly concave surface substantially coinciding with the upwardly curved isothermal fusion plane created by the electrodes in the molten refractory material supported by the refractory monolith, means for passing a heat-abstracting medium into thermal relation to the external surface of said shell to withdraw heat therefrom and to coact in protecting said refractory monolith against material fusion and resultant diminution as would be caused by invasion by said isothermal fusion plane of said refractory monolith, means mounting said electrodes for movement in directions toward or away from said monolith, means responsive to current flow to the electrodes for controlling said electrode-moving means and thereby attain substantial constancy of current input to the electrodes and means for changing the standard of operation of said electrode-moving means and thereby alter internal thermal relationships so as to raise or lower said isothermal fusion plane in relation to said concave surface of said monolith and thereby control the thickness of the latter.

28. A furnace for fusing refractory material comprising a metal furnace shell having three electrodes projecting downwardly into the shell and arranged at the apexes of a substantially equilateral triangle whose center is substantially at the vertical axis of said shell and having a bottom lining of refractory material for directly supporting the melt of refractory material, said furnace shell comprising a bottom shell and a side shell whose walls slope upwardly and inwardly, said side shell being of generally circular cross-section excepting for a substantially flattened portion in the side wall thereof that is parallel to and adjacent a side of said triangle and extending substantially along a chord of the otherwise circular cross-section of the shell, means for supplying water externally to upper portions of said sloping side walls and controllable to effect substantial envelopment of the side shell with a downwardly moving sheet of water, a discharge spout of refractory material extending through said flattened portion of said side shell, means comprising a metal sleeve-like member enveloping said discharge spout externally of said flattened portion of the side shell and in sealed connection therewith for sealing the refractory discharge spout against access thereto of water, said metal sleeve-like member having, in sealed connection therewith at an outer end portion thereof, sheet means extending generally parallel to said flattened portion and forming a physical barrier against access of water from the side shell to the discharge end of said spout means.

29. A furnace as claimed in claim 1, in which said hood structure comprises side portions built up in a general upward direction and substantially aligned with the furnace shell, said side portions having side opening means therein with door-like closure means movably supported thereby for substantially closing said opening means, said closure means falling short of completely closing said opening means at least along an edge portion thereof to thereby provide aperture means through which a probe may be inserted laterally into the furnace to probe the condition and thickness of said monolithic lining.

RAYMOND R. RIDGWAY.

REFERENCES CITED

The following references are of record in the file of this patent:

UNITED STATES PATENTS

| Number | Name | Date |
|---|---|---|
| Re. 16,054 | Moore | Apr. 28, 1925 |
| 1,069,601 | Churchward | Aug. 5, 1913 |
| 1,226,122 | Scott | May 15, 1917 |
| 1,313,890 | Gray | Aug. 26, 1919 |
| 1,339,393 | Hughes | May 11, 1920 |
| 1,917,849 | Northrup | July 11, 1933 |
| 2,133,329 | Moore et al. | Oct. 18, 1938 |
| 2,156,608 | Schon et al. | May 2, 1939 |
| 1,515,375 | Tone | Nov. 11, 1924 |
| 1,965,080 | Kemmer | July 3, 1934 |
| 686,551 | Simon | Nov. 2, 1901 |
| 775,654 | Higgins | Nov. 22, 1904 |
| 1,139,072 | Reynolds | May 11, 1915 |
| 1,277,899 | Freeman | Sept. 3, 1918 |
| 1,830,992 | Frenzel | Nov. 10, 1931 |
| 2,081,988 | Dreyfus | June 1, 1937 |
| 2,159,286 | Moore | May 23, 1939 |
| 2,297,560 | Hopkins | Sept. 29, 1942 |
| 2,334,275 | Michelat | Nov. 16, 1943 |
| 616,906 | Deuther | Jan. 3, 1899 |
| 883,110 | Hartenstein | Mar. 24, 1908 |
| 1,036,499 | Lamb | Aug. 20, 1912 |
| 1,223,278 | Helfenstein | Apr. 17, 1917 |
| 1,234,836 | Webb | July 31, 1917 |
| 1,573,095 | Saklatwalla et al. | Feb. 16, 1926 |
| 1,646,221 | Seede | Oct. 18, 1927 |
| 1,707,937 | Gerlach | Apr. 2, 1929 |
| 1,901,426 | Young | Mar. 14, 1933 |
| 2,167,575 | Kelly | July 25, 1939 |

FOREIGN PATENTS

| Number | Country | Date |
|---|---|---|
| 195,688 | Great Britain | Apr. 3, 1923 |